US006483453B2

(12) United States Patent
Oey et al.

(10) Patent No.: US 6,483,453 B2
(45) Date of Patent: Nov. 19, 2002

(54) METHOD FOR REDUCING TRANSMIT POWER FOR TRAFFIC ALERT AND COLLISION AVOIDANCE SYSTEMS AND AIRBORNE COLLISION AVOIDANCE SYSTEMS

(75) Inventors: David Oey, Bellevue, WA (US); Ruy C. Brandao, Redmond, WA (US); LuAn Vanness, Sammamish, WA (US); Larry D. King, Sammamish, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/943,039

(22) Filed: Aug. 29, 2001

(65) Prior Publication Data

US 2002/0063653 A1 May 30, 2002

Related U.S. Application Data

(60) Provisional application No. 60/229,649, filed on Aug. 31, 2000.

(51) Int. Cl.$^7$ ............................................. G01S 13/00
(52) U.S. Cl. ........................... 342/29; 342/30; 342/40; 342/82; 342/85; 342/32
(58) Field of Search ............................. 342/70, 71, 72, 342/82, 85, 29, 30, 32, 36, 37, 40, 46

(56) References Cited

U.S. PATENT DOCUMENTS 3,830,567 A * 8/1974 Riegl
5,077,673 A * 12/1991 Brodegard et al. ........... 342/32

(List continued on next page.)

FOREIGN PATENT DOCUMENTS

WO    WO 00/41000    7/2000    ........... G01S/13/93

OTHER PUBLICATIONS

"ACAS II Enhanced—Multimedia Pilot's Guide for CAS 67A and CAS81A TCASII," CD–ROM, Honeywell International, (Nov. 24, 1998).
Rick Castaldo and Carl Evers, "Atlanta Hartsfield International Airport– Results of FAA Trials to Accurately Locate/Identify Aircraft on the Airport Movement Area," IEEE (IEEE Plans, Atlanta, GA), (Apr. 24, 1996).

(List continued on next page.)

Primary Examiner—Stephen C. Buczinski

(57) ABSTRACT

The present invention provides a method for efficient use of the transmit power of a Traffic Alert Collision Avoidance System (TCAS) that allows enhanced surveillance range and limits radio frequency (RF) interference in crowded airspace. The method reduces power density in crowded airspace by modifying Mode S, Mode A and Mode C interrogations. During Mode S broadcasts, tracking interrogation power is reduced as a function of range. Further transmit power reduction is achieved by broadcasting a variable power density whisper-shout interrogation technique for Mode A/C aircraft when garbling is detected. If garbling is observed during a medium whisper-shout interrogation sequence, the method of the present invention attempts to clear the garbling by using focused high-density whisper-shout steps but only in the ranges where garbling was detected. Formation members can account for other formation members that are TCAS equipped using a special E-TCAS Broadcast Interrogation. The presence of other E-TCAS will be used in the RF interference limiting calculations. Aircraft flying in formation further minimize broadcast power by sharing information between the formation leader and formation aircraft.

43 Claims, 16 Drawing Sheets

U.S. PATENT DOCUMENTS

| | | | | |
|---|---|---|---|---|
| 5,182,563 A | * | 1/1993 | Blinchikoff et al. | 342/32 |
| 5,280,285 A | | 1/1994 | Curtis et al. | 342/32 |
| 5,317,316 A | * | 5/1994 | Sturm et al. | 342/30 |
| 5,805,111 A | | 9/1998 | Brettner, III et al. | |
| 5,923,293 A | | 7/1999 | Smith et al. | |
| 6,313,783 B1 | * | 11/2001 | Kuntman et al. | 342/32 |

OTHER PUBLICATIONS

"DO–185A Minimum Operational Performance Standards for Traffic Alert and Collision Avoidance System II (TCAS II) Airborne Equipment," CD–ROM, RTCA, (1997).

"Introduction to TCAS II Supplementary Training Material Bendix/King ATAD," Allied–Signal Aerospace Company, Nov. 1991.

"Introduction to TCAS II", United States Department of Transportation, Federal Aviation Administration, Washington, D.C., (Mar., 1990).

* cited by examiner

METHOD FOR REDUCING TRANSMIT POWER FOR TRAFFIC ALERT AND COLLISION AVOIDANCE SYSTEMS AND AIRBORNE COLLISION AVOIDANCE SYSTEMS

CROSS-REFERENCE TO RELATED APPLICATION

This application claims priority from co-pending U.S. Provisional Patent Application No. 60/229,649 filed Aug. 31, 2000, the disclosure of which is incorporated herein in its entirety for all purposes.

BACKGROUND OF THE INVENTION

(1) Field of the Invention

The present invention relates to a method for reducing the transmit power of a aircraft collision avoidance surveillance system and more particularly to a Traffic Alert and Collision Avoidance System (TCAS).

(2) Description of Related Art

It will be readily appreciated that operation of an aircraft in densely populated airspace is dangerous and requires a significant amount of the flight crew's time and attention to avoid other aircraft. In early aviation history, the task of identifying other aircraft intruding into airspace near an aircraft was left to the crew and air traffic control (ATC). However, as the number of aircraft increased, the time and attention required to navigate the aircraft through densely populated airspace began to be overwhelming.

To assist flight crews and ATC, a variety of aircraft collision avoidance systems (ACAS) have been installed on military and commercial aircraft during the last forty years. Currently, the Traffic Alert and Collision Avoidance System (commonly referred to as TCAS) is deployed on military and most commercial aircraft. TCAS provides vertical collision avoidance advisories to the flight crews and operates in traffic densities of up to 24 aircraft within 5.0 square nautical miles (0.3 aircraft per square nmi). Using the advisories, flight crews can alter their flight paths to maximize the amount of separation at the closest point of approach (CPA) as computed by TCAS based on range and range rates.

It will be appreciated that with a large number of aircraft operating in congested airspace and with each aircraft broadcasting transmissions, many of these transmissions may occur simultaneously with other aircraft or with transmissions between one of the aircraft and ATC. Thus, interference limiting is a necessary part of the surveillance function. To ensure that TCAS does not create an unacceptably high fruit rate for ATC radar, multiple TCAS units within detection range of each other (approximately 30 nmi) are designed to limit their own transmissions based on the number of aircraft in congested airspace. Thus, as the number of TCAS units increase, the interrogation rate and correspondingly the power allocation for each of them, must decrease in order to prevent undesired interference with ATC. Therefore, every TCAS unit counts the number of other TCAS units within 30 nmi. This number is often referred to as the NTA. The NTA is used by each TCAS to limit interrogation rate and transmit power as necessary. The total transmit power allowed for TCAS or other airborne collision avoidance system surveillance is limited by regulation, specifically by the Radio Technical Commission for Aeronautics (RTCA) TCAS Minimum Operation Performance Standard (MOPS) number DO-185A.

Because of the variety of avionics, the TCAS system must be designed to operate with Mode S, Mode A and Mode C avionics. Mode S is a type of interrogation and transponder reply process. The Mode S reply messages contain aircraft address identification, altitude and other information. RTCA regulations specify that Mode S tracking interrogation power use a specified transmit power that is often more than required to successfully interrogate target aircraft. In theory using maximum power to interrogate all targets provides a margin of safety regardless of distance between aircraft or the associated threat level. However, in crowded airspace, maximum transmit power from a large number of aircraft generates interference and complicates ATC operation.

TCAS also utilizes Mode A/C interrogation, which is another type of interrogation. Mode C surveillance uses an interrogation sequence that is referred to as Whisper-Shout (WS) to minimize detected synchronous garble from the air traffic control radar beacon system (ATCRBS) transponders or other Mode C transponders. Mode A equipped aircraft respond to Mode C interrogation but do not provide altitude information and thus appear as a non-altitude reporting Mode C transponder.

The whisper-shout interrogation uses variable power levels and suppression pulses to identify the range of targets. Specifically, three different Mode C interrogation sequences or modes: 1) monitor; 2) medium aircraft density; and 3) high density are used for Mode C surveillance. TCAS automatically selects the interrogation sequence required to resolve or prevent potential interference based on the aircraft in the vicinity. Accordingly, it is important to know the number of TCAS-equipped aircraft present within the airspace. If transmit power restrictions are required, surveillance capabilities will degrade.

While the total transmit power restrictions are sufficient for commonly used TCAS surveillance protocols, the transmit power restrictions set by RTCA limit the effectiveness of the TCAS in high-density airspace and prohibit incorporation of new features. Further, transmit power restrictions limit extended surveillance ranges. By way of example, the prior art TCAS limits the range of surveillance on all quadrants of the aircraft in order to comply with the DO-185A power restrictions. Clearly, there are significant benefits to providing a surveillance system with increased situational awareness in all quadrants while complying with the power restrictions set by RTCA for TCAS. It should be apparent that increased situational awareness would enhance aircraft safety in crowded airspace and support military applications of TCAS.

When multiple aircraft are in a confined airspace, there will be more frequent TCAS interrogations as each aircraft attempts to interrogate and track intruders. Thus, a method is needed that reduces the amount of transmit power when the NTA is high so that the RTCA transmit power restrictions are observed. What is also required is a method that efficiently uses transmit power to improve surveillance in terms of an extended range in crowded high-density airspace.

SUMMARY OF THE INVENTION

The present invention relates to an aircraft collision avoidance system and more particularly to a method for efficient use of the transmit power available to an aircraft using the Traffic Alert and Collision Avoidance System (TCAS). Efficient use of transmit power allows enhanced surveillance while simultaneously remaining within the transmit power restrictions set by the Radio Technical Commission for Aeronautics (RTCA) for TCAS II as specified in (MOPS) DO-185A.

In one preferred embodiment, operation of prior art TCAS is modified during Mode S broadcasts transmit at reduced power levels during the interrogation phase. More specifically, the present invention comprises a novel method for reducing Mode S tracking interrogation power as a function of range. Once traffic (an aircraft within the surveillance volume surrounding a reference aircraft) is identified, Mode S tracking interrogation is attempted using less power than what is currently specified by RTCA regulations. In accordance with the present invention, interrogation power reduction is reduced while providing surveillance of Mode S traffic. The present method is particularly useful when the other aircraft is sufficiently far away such it is not currently classified as a threat intruder and the flight crew is not currently required to begin taking evasive action.

In another embodiment, a variable power density whisper-shout interrogation technique is employed that minimizes both transmit power and the potential for garbling during Mode A/C interrogation. Mode C interrogation refers to a type of ATCRBS interrogation that requires a transponder to transmit its host aircraft's present altitude. The Mode C response to an interrogation contains information regarding the altitude encoded in a plurality of pulses positioned between framing pulses. Mode A refers to a type of ATCRBS interrogation that requires an aircraft transponder to transmit a selected identification code but without altitude information. Whisper-Shout is one method of controlling garble from the air traffic control radar beacon system (ATCRBS) transponders through the combined use of variable power levels and suppression pulses. Garble is a well-understood concept in the art. When the reference aircraft encounters two or more TCAS aircraft, a TCAS aircraft and a ground site or two ground sites in a multi-site environment with overlapping surveillance areas, the environment may generate non-synchronous garbling. Synchronous garble is the erroneous, distorted or lost data caused when two or more aircraft are interrogated within a few microseconds of each other. This is most often caused by replies to the interrogation overlapping in time from vertically separated aircraft.

Prior art TCAS specifies three different Mode C interrogation sequences: 1) monitor; 2) medium-density; and 3) high-density. During the Mode C interrogation sequence, TCAS automatically selects the interrogation sequence required to resolve or prevent potential garbling.

The present invention discloses a method that combines characteristics of the medium and high-density Mode C interrogation sequences with variable transmit power control such that increased power is only applied within a beam when required to alleviate potential or observed garbling. If garbling is observed during a medium whisper-shout, the method of the present invention attempts to clear the garbling by using focused high-density whisper-shout steps but only in the ranges where garbling was detected.

In yet another embodiment of the present invention, a special E-TCAS Broadcast message is used to provide accurate NTA counts to E-TCAS equipped aircraft that are flying in formation. A broadcast inhibit is currently employed by aircraft flying in formation to minimize TCAS transmit power. By minimizing the count of aircraft, commercial aircraft need not track the formation members and TCAS will not unnecessarily determine that the airspace has a high number of TCAS units that require a reduction in surveillance rate and range. More specifically in E-TCAS, formation members will not transmit UF 16 TCAS broadcast. Thus, commercial aircraft will not unnecessarily reduce their broadcast power because of an apparent high aircraft density in the airspace. The formation members will transmit a UF 19 E-TCAS broadcast so that other E-TCAS equipped military aircraft will always have an accurate count of aircraft density. UF 19 E-TCAS is the broadcast protocol reserved for military aircraft. Receiving E-TCAS aircraft, in accordance with the present invention, will use the UF 19 TCAS in generating an NTA count, but the surveillance range for commercial TCAS units in the area will not be affected by the presence of the formation.

In yet another embodiment of the present invention, aircraft flying in formation minimize broadcast power by sharing information between the formation leader and the other aircraft in the formation. Accordingly, transmit power is minimized even though there are significant numbers of aircraft in the area. More specifically, one method of the present invention provides for the formation leader to perform active surveillance with 360-degree range coverage. The formation leader data-links the contents of its TCAS intruder file to other members of the formation. Formation members use passive surveillance to track the position of the formation leader as well as the positions of the other ADS-B equipped intruders in the vicinity. ADS-B refers to a type of aircraft surveillance that utilizes global positioning system (GPS) data to track traffic within the surveillance volume.

The formation leader uses the UF/DF 19 data-link to exchange the following data to other aircraft in the formation: time stamp, intruder's position, bearing, altitude and Mode A identifier. Mode A refers to a type of ATCRBS interrogation that requires an aircraft transponder to transmit a selected identification code but does not transmit data in the altitude field. Only intruders that are obtained via the formation leader's active surveillance will be data-linked to other aircraft in the formation so as to minimize transmit power from the formation.

These and other advantages of the present invention not specifically described above will become clear within the detailed discussion herein.

DETAILED DESCRIPTION OF THE INVENTION

In the following description of the preferred embodiment, reference is made to the accompanying drawings, which form a part hereof, and in which is shown by way of illustration a specific embodiment in which the invention may be practiced with respect to avionics systems. In the following description, numerous specific details are set forth in order to provide a thorough understanding of the present invention. It will also be apparent, however, to one skilled in the art that the present invention may be practiced without these specific details.

The present invention relates to an aircraft avoidance system and more particularly to a method for efficient use of the transmit power available to an aircraft using the Traffic Alert and Collision Avoidance System (TCAS). Efficient use of transmit power allows enhanced surveillance while simultaneously remaining within the transmit power restrictions set by the Radio Technical Commission for Aeronautics (RTCA) for TCAS as specified in (MOPS) DO-185A.

Figure 1:
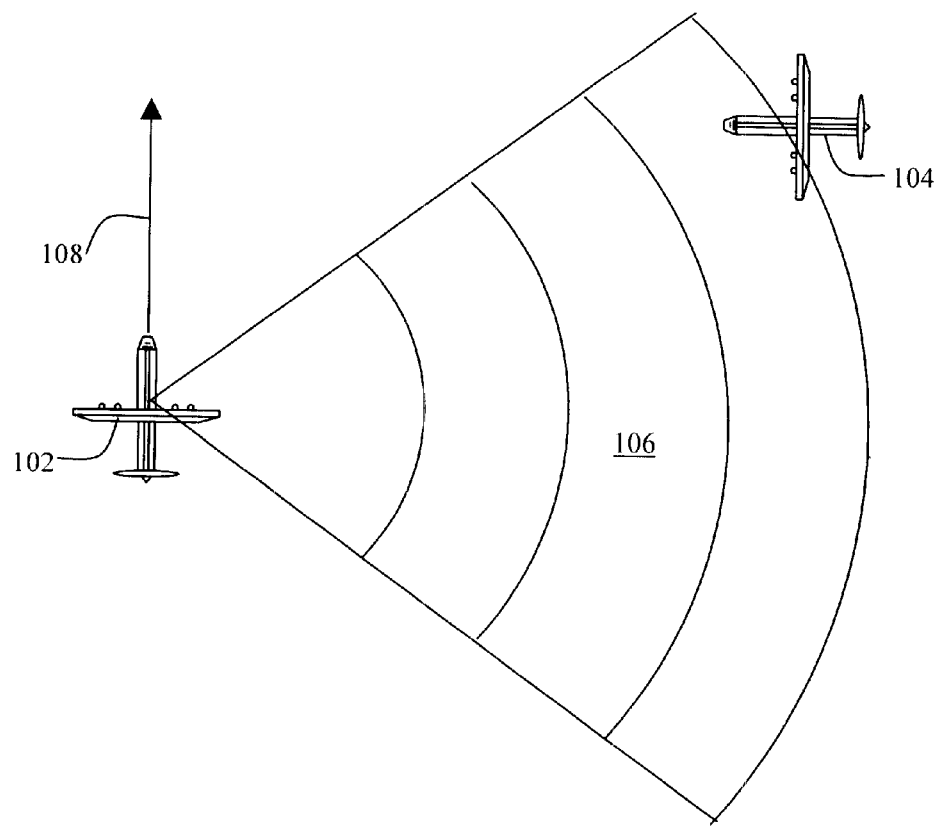
FIG. 1 illustrates an airborne collision avoidance system.

FIG. 1 illustrates a Traffic Alert Collision Avoidance System (TCAS), which is an airborne system deployed on aircraft such as reference aircraft 102 and traffic 104. TCAS is used to detect and track other aircraft in a surveillance volume surrounding reference aircraft 102. In FIG. 1, a portion of the surveillance volume is shown, specifically a side quadrant 106. One familiar in the art will appreciate that the surveillance volume will extend in all a directions as well as above and below reference aircraft 102. The primary purpose of the TCAS is to alert the flight crew of the reference aircraft to the potential of collisions with other aircraft.

TCAS interrogates other aircraft within surveillance volume 106 and analyzes replies to determine range, bearing, and if altitude reporting, the relative altitude with respect to reference aircraft 102. With aircraft 104 approaching the flight path of reference aircraft 102, TCAS develops recommendation for evasive maneuvers to minimize the likelihood of mid-air collisions. The flight path is indicated by reference arrow 108. TCAS will initiate interrogation of aircraft 104 once it intrudes into the surveillance volume, that is side quadrant 106, and begin the process of tracking the intruder.

TCAS analyzes the data received from aircraft 104 to determine if a potential for a collision exists. Should TCAS determine that no collision is likely, aircraft 104 is classified as a non-threat intruder or merely traffic. Should TCAS determine that a collision potential exists and aircraft 104 is within six nautical miles range and at an altitude less than 1200 feet above or below reference aircraft 102, aircraft 104 is classified as a threat intruder. As used herein, the terms "traffic" and "intruder" may be used interchangeably to refer to both traffic and intruders unless the context requires precise distinction.

In the cockpit of aircraft 102, the flight crew is advised of the proximity of both traffic and threat intruders. When TCAS issues an advisory a message is given to the pilots containing information relevant to collision avoidance. There are two types of advisories generated by TCAS. A traffic advisory is a presentation that another aircraft is within the surveillance volume but does not yet warrant advising the flight crew to begin evasive maneuvers. Each traffic advisory may become a resolution advisory within a selected time period if aircraft 102 and 104 remain on track and the likelihood of a collision is predicted by TCAS. Typically, the resolution advisory recommends a vertical maneuver that should be performed to maintain vertical separation relative to the identified threat intruder.

Figure 2:
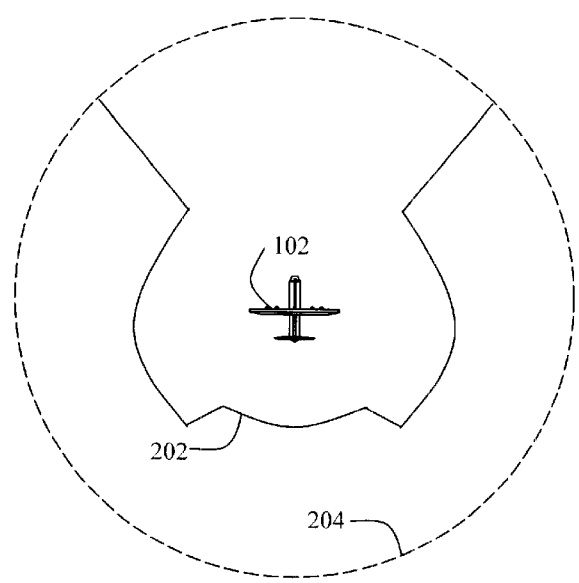
FIG. 2 illustrates the surveillance volume surrounding a reference aircraft.

In FIG. 2, a 'look-down' view is shown of reference aircraft with the surveillance volume 202 (solid line) and 204 (dashed line) illustrated. Surveillance volume 202 represents the prior art surveillance volume that extends to about 40 nautical miles in the front quadrant of the reference aircraft 102 and to a lesser range in the sides and aft quadrants. Surveillance volume 202 also extends about 10,000 feet above and below reference aircraft 102. Surveillance volume 202 will decrease when flying into a high-density area and may be reduced down to about 7 nautical miles in the forward quadrant in airspace having high aircraft density. In general, the surveillance volume is a truncated sphere, with a minimum radius equal to the distance the reference aircraft would travel between traffic advisories.

In contrast, in accordance with the present invention, surveillance volume 204 extends the range in the side and aft quadrants. Further, it is possible to further extend the range due to the efficient utilization of transmit power. Thus, it is projected that surveillance volume 204 could readily extend to about 60 nautical miles without generating interference with existing ATC communications.

Interference limiting is a necessary part of the surveillance function. To ensure that TCAS does not create an unacceptably high fruit rate for ATC radar, multiple TCAS units within detection range of each other (approximately 30 nmi) are designed to limit their own transmissions. As the number of such TCAS units within an airspace (often referred to as the NTA count) increases, the interrogation rate and power allocation for each of them must decrease to prevent undesired interference with ATC. Therefore, every TCAS unit counts the number of other TCAS units within detection range. To count aircraft, TCAS broadcasts messages, which include the Mode S address of the transmitting aircraft, every eight seconds. Mode S transponders accept the broadcast message without replying and relay these messages on to their corresponding TCAS. These messages are monitored by an interference-limiting algorithm in TCAS to develop an estimate of the number of TCAS units within detection range. The number of total TCAS units is used by each TCAS to limit the interrogation power and receiver sensitivity as necessary.

In collision avoidance, the time-to-closest point of approach is more important than distance-to-go to the closest point of approach. To exploit this idea, the TCAS system calculates TAU, which is an approximation of the time in seconds to the closest point of approach between two aircraft. TAU is the ratio of range (in nautical miles) to range rate that represents the time to CPA for two aircraft on a collision course assuming unaccelerated relative motion. Threat evaluation is based upon a Tau criterion where:

$$Tau=3600 \times Range/Range\ Rate \qquad (1).$$

TCAS uses the TAU concept for determining whether thresholds that require an alert to be issued have been met. For example, the combination of range and closure rate that would trigger a traffic advisory with a 40 second TAU and a resolution advisory with a 25 second TAU varies depending on the rate of closure and the range of the intruder. Interrogations must be sufficiently frequent to enable timely TAU calculations.

Figure 3:
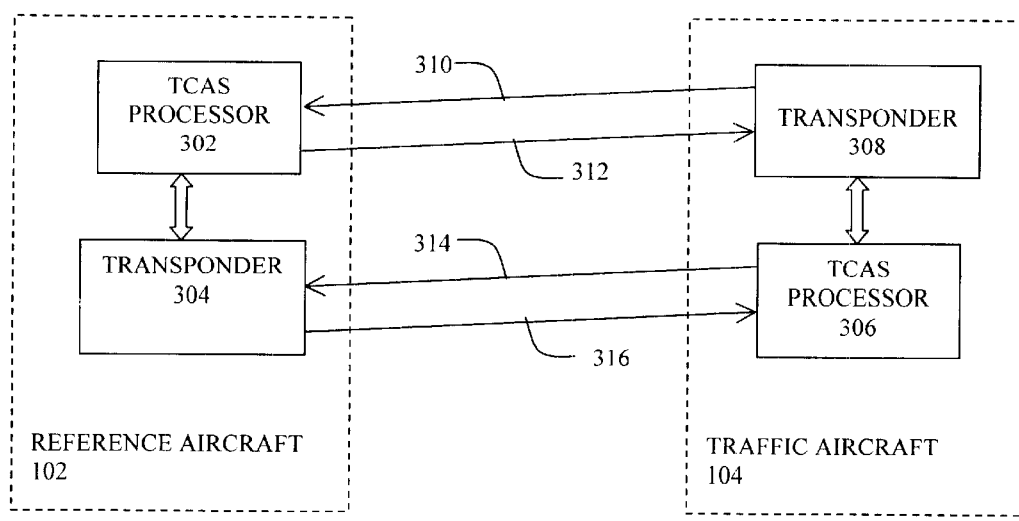
FIG. 3 is a block diagram of a simplified collision avoidance system.

FIG. 3 illustrates the basic components of a traffic collision avoidance system (TCAS) comprising a TCAS processor unit 302 on aircraft 102. Other aircraft, such as traffic aircraft 014 are similarly equipped with processor unit 306 and transponder 308. Interrogations 312 broadcast by processor 302 are received and responded to by transponder 308 of traffic aircraft 104 as indicted by the reply 310 broadcast. Traffic aircraft 104 is also in communication with transponder 304 of reference aircraft 102. Specifically, aircraft 104 broadcasts interrogations 314 and receives replies 316 from transponder 304.

Processor unit 302 is responsible for implementing primary TCAS functions such as conducting surveillance of the airspace surrounding the reference aircraft, tracking intruders, determining when an intruder constitutes a threat and generating a coordinated resolution with the intruder so as to maximize separation of aircraft at the closest point of approach. Processor 302 further acts as a general-purpose communication processor and it is primarily responsible for input of reference aircraft data and periodic transponder data and generating advisory information. The collision avoidance logic parameters determine the protection volume surrounding the referenced TCAS aircraft. If a tracked target is a collision threat, TCAS processor 302 selects the best avoidance maneuver; and if the threat aircraft is also equipped with a TCAS, the maneuver is coordinated between aircraft.

TCAS processor 302 is operationally coupled to a transponder 304. Transponder 304 performs normal air traffic control functions associated with Mode S, Mode A and Mode C transponders. Because of its selective address capability, the Mode S transponder is also used to provide air-to-air data exchange between two TCAS-equipped aircraft to coordinate complimentary resolution of conflict.

TCAS includes a plurality of antennas (not shown) to transmit and receive air-to-air data. A typical configuration includes a top directional antenna 322 for transmitting interrogations at various power levels in each of four 90° azimuth quadrants, forward, aft and both sides. Use of directional antenna 322 partitions replies to reduce synchronous garbling received from other aircraft in the area. An omni-directional or directional transmitting and receiving antenna is mounted on the bottom of the aircraft to provide range and altitude data on targets that are below the referenced TCAS aircraft. A TCAS control panel (not shown), in the cockpit of the referenced TCAS aircraft, enables the flight crew to select and control operation of the TCAS processor 302 and transponder 304.

Mode S Surveillance

Mode S is a type of interrogation and transponder reply process. The Mode S reply message contains aircraft address identification, altitude and other information. In accordance with the present invention, a novel method is employed to reduce Mode S tracking interrogation power as a function of range. Specifically, once an intruder aircraft is identified, Mode S tracking interrogation is attempted using less power than what is currently specified by RTCA regulations. TCAS surveillance for a Mode S equipped reference aircraft is relatively straightforward. TCAS listens for squitter transmissions (squitters) generated once per second by Mode S transponders. Each transponder broadcasts a unique Mode S address associated with the sender. Broadcast means a transmission by a Mode S sensor for which no reply is required of Mode S transponders. Following receipt of squitter transmissions, the reference aircraft sends a Mode S interrogation to the Mode S address contained in the received squitter, and from the reply, determines range and (if available) altitude of the Mode S intruder. TCAS can also detect the altitude of Mode S targets by listening for Mode S replies generated in response to Mode S interrogations by ground stations or other TCAS aircraft.

Prior art Mode S tracking interrogation power regulations specify that interrogation power is reduced as a function of range for targets within ten nautical miles. By way of example, DO-185A (section 2.2.4.6.2.2.4) specifies that $PT=Pmax+20 \log (R/10)$ where PT denotes the transmit power, R denotes the range and Pmax denotes the maximum transmit power. However, for targets beyond ten nautical miles, Mode S tracking and interrogation power is never reduced. Thus, maximum interrogation power is used to track targets beyond ten nautical mile range regardless of the actual range or power requirement. If aircraft density increases, then the number of targets around the ten nautical mile range may become significant in terms of total transmit power from each aircraft. This increase in the power density results in increased interference. Clearly, it is desirable to minimize transmit power in high-density applications beyond the 10 nmi range while maintaining adequate surveillance coverage for each aircraft.

In the present invention, Mode S tracking interrogation power is reduced for all aircraft within the surveillance volume surrounding the reference aircraft once initial detection is obtained. Targets detected within the ten nautical mile range are interrogated at a reduced power in accordance with the formula used in prior art Mode S tracking systems. Targets greater than ten miles are initially interrogated at full power. However, to minimize interrogation power for target aircraft detected at or greater than ten nautical mile range, the present invention uses a novel operational sequence to interrogate targets thereafter.

More specifically, transmit power for tracking interrogations for all Mode S intruders is reduced in an iterative fashion throughout the protected volume and not just those within 10 nmi. Mode S tracking interrogation power is reduced as a function of range by using the following rule set:

1) The initial tracking interrogation occurs at maximum power (Pmax) for intruders at ranges greater than 10 nmi or using the existing $PT=Pmax+20 \log (R/10)$ formula for intruders within 10 nmi.

2) Follow-on tracking interrogations are successively reduced in power until either the intruder does not reply or the minimum power limit (Plim) is reached.

3) The size of the step reductions will be 1 dB for intruders at ranges of 20 nmi or more and 2 dB for intruders within 20 nmi.

4) If a retry is needed, the retry will be at Pmax for intruders at ranges greater than 10 nmi or $PT=Pmax+20 \log (R/10)$ for intruders within 10 nmi.

5) The interrogation immediately following a retry will be at a power level halfway in-between Pmax and the power level where the intruder did not reply.

6) Successive reductions thereafter will be in 1 dB steps.

In general, the power for tracking interrogations will not drop below a minimum power limit, Plim. The value for Plim will be a function of range based on the formula:

$$P\text{lim}=P\text{max}+20 \log(R/40) \quad (2).$$

7) If the range is greater than 40 nmi, no power reduction step will be applied and, accordingly:

$$P\text{lim}=P\text{max} \quad (3).$$

Figure 4:
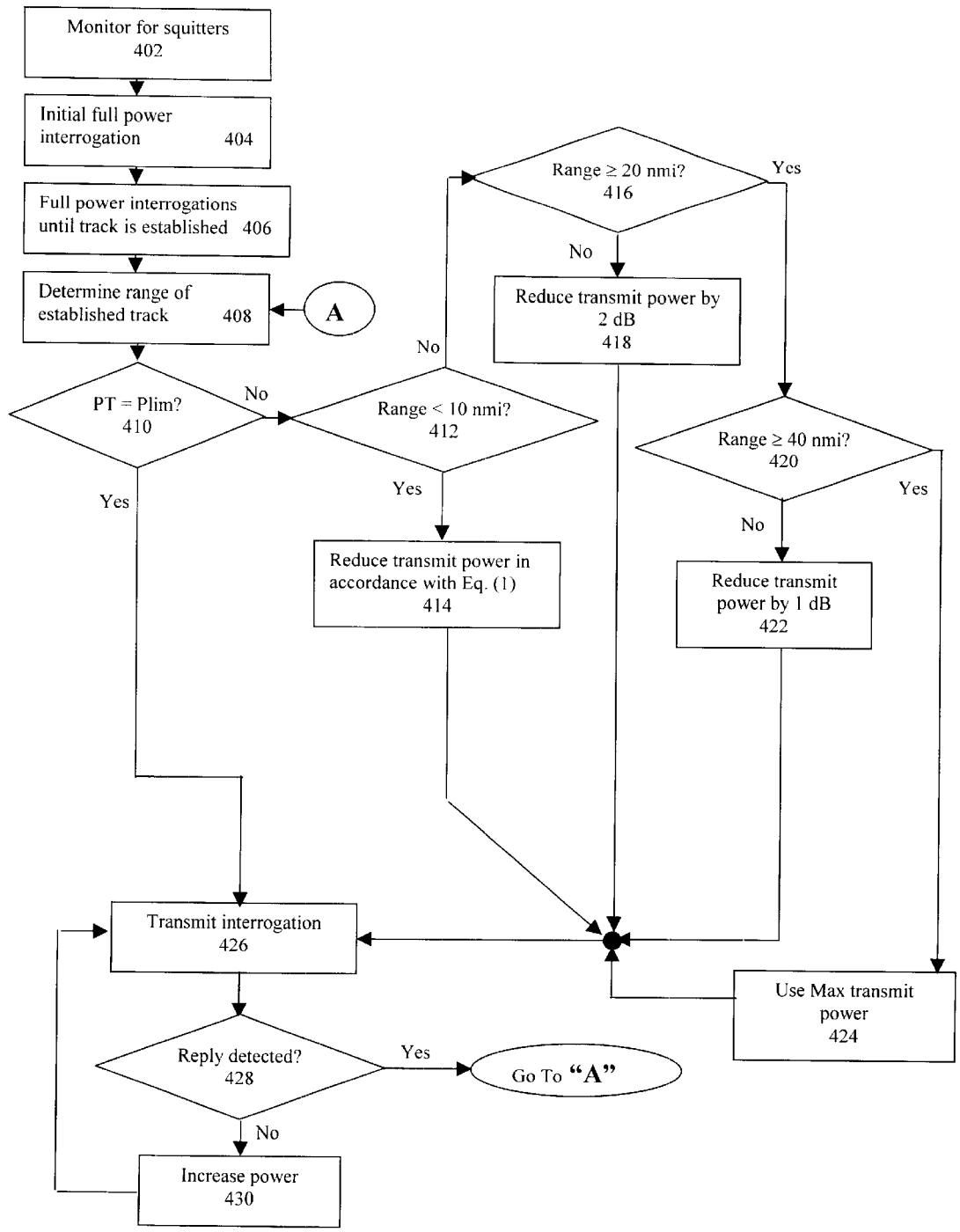
FIG. 4 is a flow diagram of a Mode S interrogation sequence.

This rule set is incorporated into the operational sequence illustrated in FIG. 4 where in step 402, TCAS monitors for squitters from aircraft intruding into the surveillance volume surrounding the reference aircraft. Squitters are unsolicited, regularly occurring transmissions by all Mode S transponders to aid in acquisition by TCAS Mode S sensors. Squitter transmissions are uniformly distributed over a range of from 0.8 to 1.2 seconds. Upon detection of a squitter by the surveillance aircraft, a full power interrogation is broadcast as indicated at 404 to obtain the altitude and range of the target intruder. If the intruder is a candidate for a track, then TCAS will continue to transmit full power interrogations until the track is established in step 406.

After the track is established, TCAS on the reference aircraft examines the range of the target intruder as indicated at step 408. Prior to the next interrogation broadcast, TCAS checks the transmit power to ensure that a minimum transmit power is maintained for each track, step 410. If the transmit power is greater than the minimum limit, the present invention follows the algorithm described in steps 412–424 to determine the appropriate broadcast power. If, at step 410, TCAS determines that minimum transmit power is selected, process flow proceeds to step 426 to transmit the next interrogation.

If the transmit power exceeds the minimum, the present invention implements a procedure to reduce transmit power based on the range to the target intruder. As indicated at step 412, if the range to the target intruder is less than 10 nmi, operation proceeds in accordance with the prior art systems. Accordingly, transmit power is reduced in accordance with Equation (1), step 414. Subsequent interrogation is transmitted at a reduced power as indicated at step 426. Operation of the TCAS system with respect to intruders within 10 nmi is not further described as it is believed to be well known in the art.

If, however, the range is greater than 10 nmi in step 412, operation proceeds to step 416 where an additional check is made to determine if the range to target intruder is greater than a selected first range limit. If the range to the target intruder is greater than (or equal to) 10 nmi but less than a first range limit, operation of the TCAS system reduces the transmit power by 2 dB, step 418. Subsequent interrogation is transmitted at the reduced power as indicated at step 426. In one preferred embodiment, the first range limit is selected to be at 20 nmi, although other range limits may be appropriate so as to segment the surveillance volume into either larger or smaller volumes. For example, the range check of step 416 may occur at the 25 nmi range or 30 nmi range should system design so dictate.

If the range of the target intruder is greater than (or equal to) the first range limit, an additional check must be performed to determine if the range to the target intruder is greater than a second range limit, step 420. In the preferred embodiment, the second range limit is selected to be at 40 nmi in step 420. If the target is at the outer limit of the surveillance volume, interrogation broadcasts occur at the maximum power as indicated at step 422. Otherwise, the transmit power will be reduced by 1 db for subsequent broadcasts as indicated at step 424. It will be understood that the second range limit in step 420 may depend on the size of the surveillance volume, the tau or other such factors and may be greater or less than the 40 nmi of the preferred embodiment.

Once the interrogation transmit power is set, the Mode S interrogation broadcast is made in step 426. The present invention must then determine whether the transmit power was sufficient to obtain the necessary reply, step 428. If the reduced power broadcast used in step 426 generates a range response, process flow then returns to step 410 to determine whether the transmit power has reached a selected minimum limit. If the power limit has not yet been reached, operation returns to step 410–424 and the cycle repeated until the target intruder is no longer within the surveillance volume. If, however, the power limit has been reached, operation returns to step 426 for the next schedule broadcast without any further reduction in transmit power. Thus, if the target continues to respond, transmit power reductions will be implemented until a minimum threshold is reached after which no further reduction in broadcast power is allowed.

In the event the target does not respond with its range information in verification step 428, process flow proceeds to step 430, where an increase in broadcast power is implemented. It will be appreciated that is not desirable to ramp power back towards maximum once a target fails to respond to a reduced power broadcast. Accordingly, once a target fails to respond, broadcast power is immediately increased to full maximum power to reacquire target range in a single step. If the increase in broadcast power results in re-establishing contact with the target, then the target is still within the surveillance volume. Thus, operation proceeds again through the power reduction sequence comprising steps 410–426 with the exception that the initial power level is set to the mid-point between the last transmit power where contact was lost and maximum transmit power.

If the broadcast power has been increased to maximum but the target continues to fail to respond, then, as with the prior art TCAS, the target is classified as being outside the surveillance volume surrounding reference aircraft. The target is removed from the tracking list and operation proceeds back to step 402 where the TCAS system listens for squitters from aircraft intruding into the surveillance volume.

In this manner, the TCAS system identifies targets within the surveillance volume surrounding reference aircraft that are at a significant distance (that is, greater than ten nautical miles) from the reference aircraft while dynamically reducing interrogation power. These target aircraft are tracked using the minimum amount of interrogation power necessary to track each target. Initial identification is conducted at max power in accordance with the prior art mode of interrogation. However, once targets are established tracks, the present invention reduces interrogation power and continually checks the response to verify that contact is not lost due to insufficient power. Accordingly, the present invention determines whether to increase or decrease interrogation power. As aircraft density increases, incremental reductions in interrogation power from each aircraft minimize interference thereby improving the efficiency of communication between ATC and the aircraft and between aircraft. Thus, more aircraft may safely operate in crowded airspace.

It should be noted that regardless of the power of the previous interrogation or aircraft density, interrogations in response to a RA between the reference aircraft and an identified intruder is conducted at the full power. Interrogations at full power minimize the likelihood of interference that could inhibit the ability of the reference aircraft to correctly respond in a timely manner to avoid a collision.

Mode A/C Surveillance

Prior art TCAS also uses a modified Mode C interrogation known as the "Mode C only all-call", to interrogate Mode A/C transponders on other aircraft at a normal rate of once per second. Mode C interrogation refers to a type of ATCRBS interrogation that requires a transponder to transmit the host aircraft's present altitude. The Mode C response to an interrogation contains information regarding the altitude encoded in 13 pulse positions between framing pulses. The replies from Mode C transponder targets are tracked in range, bearing and altitude. These data are passed on to the collision avoidance logic for traffic advisory and resolution advisory detection and display.

Surveillance of Mode A/C targets is complicated by problems of synchronous garbling. Synchronous garble is the erroneous, distorted or lost data caused when replies are received from two or more Mode A/C targets within a few microseconds of each other. These replies to the interrogation(s) overlap in time from vertically separated aircraft. This condition occurs because of the vertical fan shape of the secondary surveillance radar beam used in Mode C interrogation.

When a Mode C interrogation is issued by TCAS, all Mode A/C transponders that detect it will reply with a 21-microsecond response. Because of the length of the response, all Mode A/C-equipped aircraft within a range difference of about 1.7 nmi from the TCAS, will generate replies which garble (overlap each other) when received at the TCAS. This is called synchronous garble. Hardware degarblers, incorporated in prior art TCAS systems, can reliably decode up to three garbled replies. By combining hardware degarblers with variable power levels and suppression pulses, it is possible to reduce the number of transponders that reply to a single interrogation. This technique, known as whisper-shout, consists of a series of interrogations that increases in power in discrete steps.

A low power level is used for the first interrogation step of a whisper-shout sequence. During the next interrogation step, a suppression pulse is first transmitted to suppress replies from aircraft that responded to the previous interrogation or interrogations. Then, an interrogation pulse, at a slightly higher power level, follows the suppression pulse. This sequence suppresses most of the transponders that had replied to the previous interrogation(s), but elicits replies from an additional group of transponders that did not previously reply. The whisper-shout procedure progresses in a series of steps to separate Mode A/C replies into several groups segregated at a series of zones within the surveillance volumes to reduce the possibility of garbling. The whisper-shout sequence is transmitted once during each surveillance update period, which is nominally about one second. This technique takes advantage of differences between receiver sensitivity of transponders and the transponder antenna gains of the target aircraft. Depending on the number of Mode A/C intruders in the surveillance volume surrounding the reference aircraft various whisper-shout interrogation sequences are used. The prior art TCAS specifies three different Mode C interrogation sequences or modes: 1) monitor; 2) medium-density; and 3) high-density and TCAS must automatically select the interrogation sequence required to resolve or prevent potential interference or garbling.

Initial interrogations are made at the monitor level until replies are detected. If replies are detected, a 6-step medium-density whisper-shout interrogation sequence is employed. If, however, garbling is detected while using the medium-density whisper-shout sequence, a 24-step whisper-shout interrogation sequence is implemented to clear out the garble at all ranges. It will be appreciated that the high-density interrogation is inefficient if garbling is only occurring within a zone of the surveillance defined by a specific range. Interrogations are also made to each of four quadrants. Thus the front quadrant, both side quadrants, and the aft quadrant are interrogated separately using the top directional antenna. Clearly, in crowded airspace, the likelihood of a garbling is high and the whisper-shout sequence will likely need to use the high-density sequence thereby increasing transmit power unnecessarily.

Figure 5:
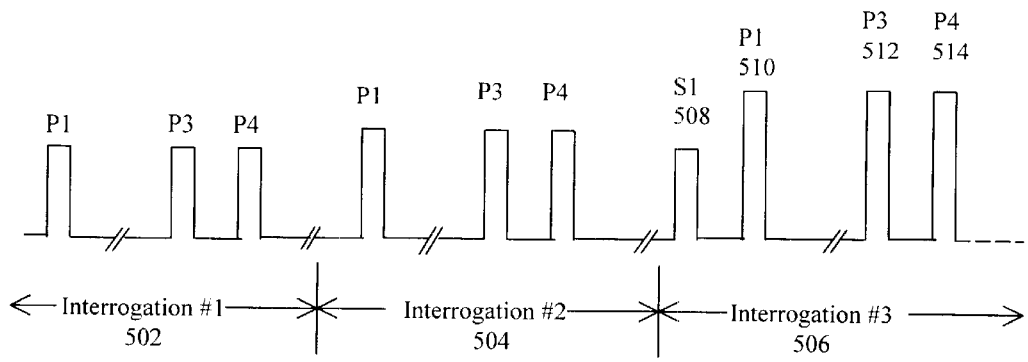
FIG. 5 illustrates a broadcast whisper-shout sequence.

In a partial representation of a whisper-shout sequence, such as illustrated in FIG. 5, power is initially radiated out of a selected antenna (that is, either the directional top antenna or the lower antenna) at the minimum level. No suppression pulse is transmitted on the first two interrogations 502 and 504 respectively. The first interrogation 502 is transmitted at a minimum power level with each succeeding transmission at successively higher power levels. Beginning with interrogation 506, a suppression pulse 508 is transmitted prior to the P1 pulse 510. P3 and P4 pulses 512 and 514, respectively, follow the P1 pulses. The pulses P1, P3 and P4, by their position, amplitude and duration either evoke or inhibit transponder replies and specify the type of replies required.

Although not shown in FIG. 5, a P2 pulse follows each P1 pulse as is well understood by those familiar with the operation of TCAS. The P2 pulse is transmitted omnidirectionally from the interrogating antenna at a reduced power of 3 dB relative to P1 for side lobe suppression.

During the first interrogation 502, the receiver on the reference aircraft is set to the least sensitive trigger level (MTL) because power output is low and only closely positioned transponders will reply. As the whisper-shout sequence progresses, the sensitivity level of the receiver is increased to detect the expected replies.

For an aircraft with a top directional antenna and a bottom omnidirectional antenna, the whisper-shout sequence conducts a series of scans. The first scan is a forward scan of six steps where the total power output (TPO) steps from about 32 dBm to full power at 52 dBm (160 Watts) at the antenna terminals. Then the omnidirectional antenna broadcasts interrogations in four steps with TPO stepped from 34 dBm to 28 dBm. Interrogations are then broadcast from the top antenna to the right and then to the left of the reference aircraft. Both side scans include five steps in each direction with TPO stepped from 48 dB to 32 dB. Finally, interrogations are broadcast to the aft from the top antenna. This scan includes four steps with TPO stepped from 43 dB to 31 dB. This series of scan sequences provides the typical medium-density whisper-shout sequence that provides an acceptable level of degarbling in airspace having moderate aircraft density. For each step in a scan where the interrogation power is increased, the minimum trigger level (MTL) of the receiver is reduced as well to limit interference.

Higher density whisper-shout sequences are employed when garbling is detected. The high-resolution sequence, not shown, typically includes 24 steps in the forward direction with TPO stepping from 52 dB to 29 dB and the MTL stepping from −74 dB to −57 dB. To minimize interference, higher power interrogations are dropped from a sequence for each quadrant. The decision to drop interrogations is dependent on the number of total aircraft (NTA) detected within the airspace surrounding the reference aircraft.

Figure 6:
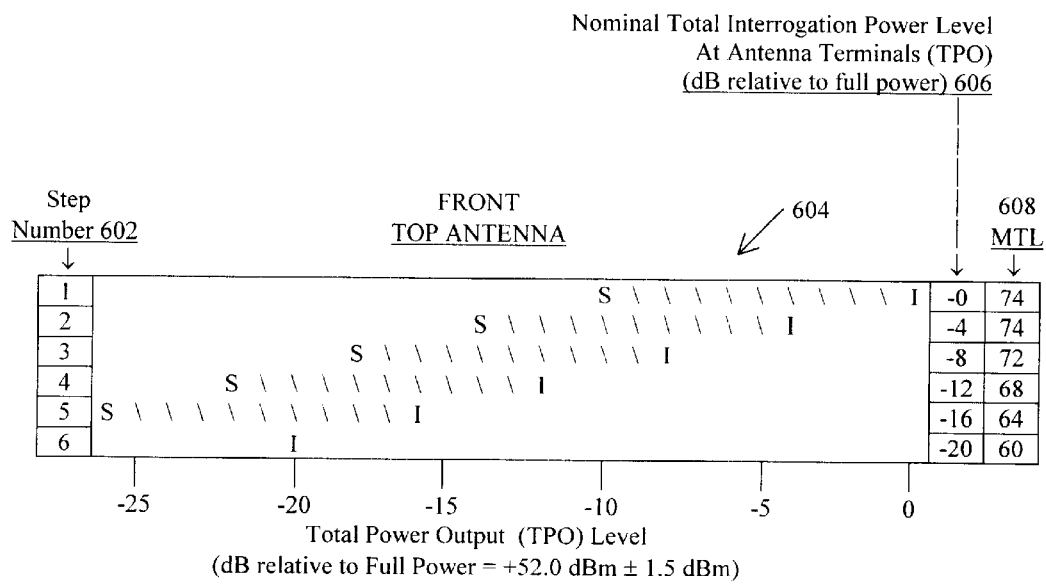
FIG. 6 is a diagram showing the whisper shout sequence for a medium-density sequence for the front quadrant.

Referring now to FIG. 6, a medium-density whisper-shout sequence transmitted by the top antenna on the reference aircraft for the front quadrant is illustrated. The letter 'S' represents the suppression S1 pulse for the whisper-shout sequence in column 604. The letter 'I' indicates the total power output (TPO) of the P1, P3, and P4 interrogation pulses. As commonly practiced, no S1 pulse is transmitted during Step Number 6, which is typically transmitted first.

As used in column 604, the notation 'S\\\\\\\\I' means that the suppression pulse S1 is −10 dB below interrogation pulses P1, P3 and P4 to form the 10 dB "Bins" that comprise the whisper-shout sequences with each bin corresponding to a portion or zone within the surveillance volume. The nominal interrogation power level for pulses P1, P2 and P4 are denoted in column 606.

The MTL specified in column 608 is in −dBm. The MTL is lowered as the broadcast power increases from step number 6 through step number 1. Interference limiting will occur by reducing the power of each step in the sequence by 1 dB.

Top Antenna, Standard Moderate Density Whisper-Shout—
Side Quadrant

Figure 7:
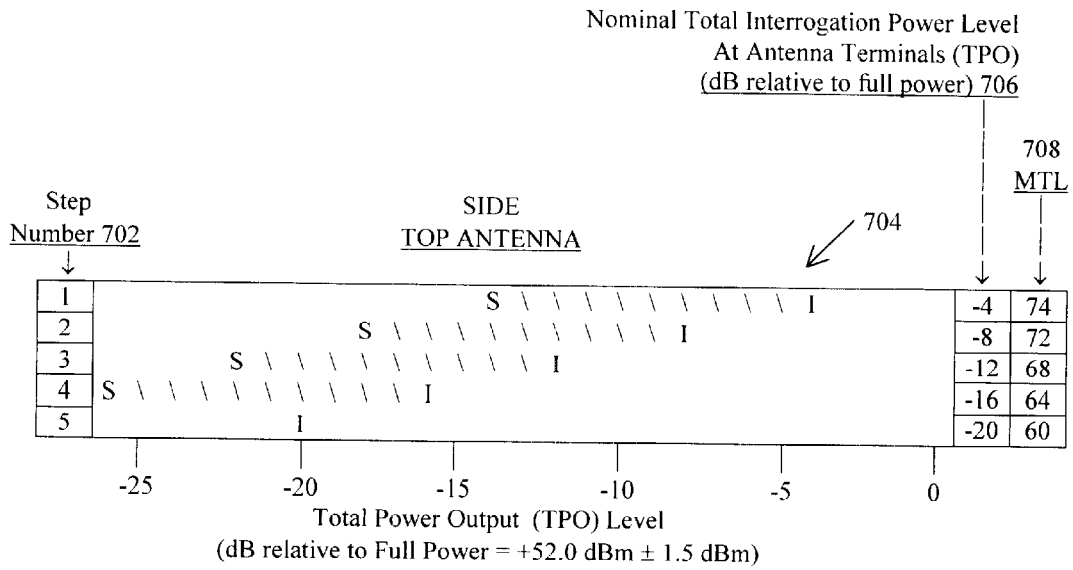
FIG. 7 is a diagram showing the whisper shout sequence for a medium-density sequence for the side quadrants.

Referring now to FIG. 7, a medium-density whisper-shout sequence for side quadrants is illustrated for the top directional antenna. The top antenna uses this whisper-shout sequence when a moderate density sequence on the side quadrant is required. As before, the letter 'I' represents the interrogation pulses, which are transmitted at the indicated TPO. The notation "S\\\\\\\I" means that the total power output for the suppression pulse S1 is 10 dB less than the interrogation pulse TPO to form the 10 dB bin.

Top Antenna, Standard Moderate Density Whisper-Shout—
Aft Quadrant

Figure 8:
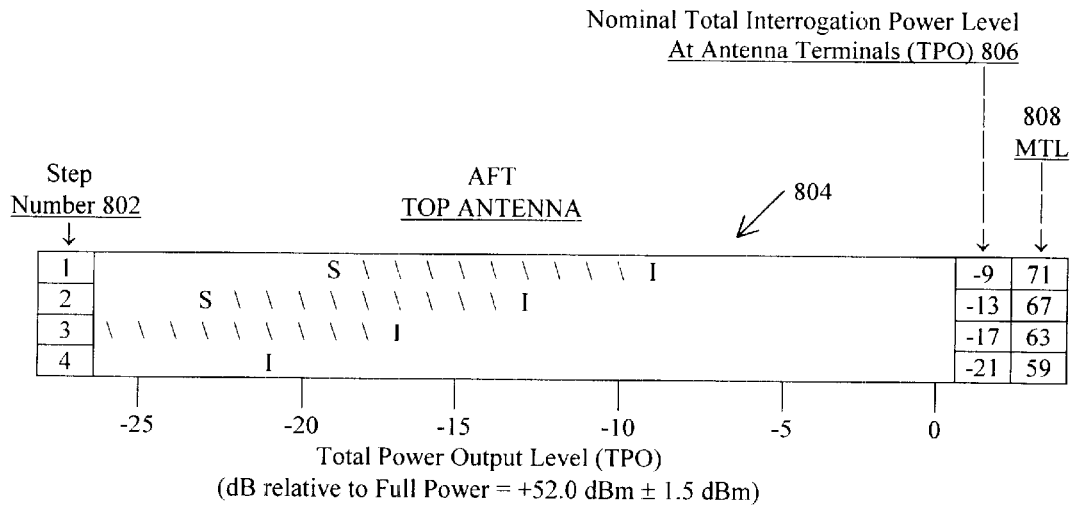
FIG. 8 is a diagram showing the whisper shout sequence for a medium-density sequence for the aft quadrant.

FIG. 8 illustrates a medium-density whisper-shout sequence for the aft quadrant. As in the description above with respect to the front and side quadrants, the sequence of steps shown in FIG. 8 is broadcast to the rear by the directional antenna to detect intruders. The maximum allowed interference limiting power reduction for the Mode C and whisper-shout interrogations is currently 7 dB in the forward quadrant (FIG. 6) and 11 dB in the side quadrants (FIG. 7) and 16 dB in the aft quadrants (FIG. 8). When the reference aircraft is on the ground, the maximum allowed interference limiting power reduction is 10 dB in all quadrants for the top antenna.

Variable Whisper-Shout Sequence

In accordance with the present invention a variable density whisper-shout interrogation technique is employed that minimizes both transmit power and garbling for Mode A/C interrogation. Rather than implement the 24-step high-density whisper-shout sequence when garbling is detected, the variable density whisper-shout interrogation is transmitted. The variable density whisper-shout sequence is particularly useful in overcoming garbling in specific ranges while minimizing broadcast power. The present invention discloses a variable density method that combines characteristics of the medium and high-density interrogation sequences with variable power such that additional interrogations are only applied within a beam where required to alleviate potential or observed garbling. If garbling is observed during a medium-density whisper-shout, variable-density whisper-shout steps are used to clear the garbling in the specific range where the garbling was detected. The balance of the whisper-shout pattern remains a medium-density interrogation. Only if the medium-density and the variable-density whisper-shout patterns are unsuccessful will the high-density pattern be employed.

When the medium-density whisper-shout sequence generates garbling, then a variable-density whisper-shout sequence is transmitted rather than the high-density 24-step whisper shout to clear up the garbling. The variable-density whisper-shout sequence attempts to eliminate the garbling by using high-density whisper-shout steps only in the range where the garbling was detected. For instance, if, in the front quadrant, only Step 3 of the medium density whisper-shout experienced garbling, then only those high-density steps corresponding to a Step 3 variable whisper-shout sequence will be used to clear up the garble. The rest of the whisper-shout pattern will remain as a medium density so as to minimize total transmit power. If the bottom antenna is omnidirectional, there is no change in the whisper-shout pattern. However, if the bottom antenna is also a directional antenna, the variable whisper-shout sequence is preferably implemented for both top and bottom antenna broadcasts. For purpose of explanation, the following description relates to the top antenna. It will be readily apparent to one skilled in the art to implement similar variable whisper-shout sequences on the bottom antenna, if desired, in view of the following description.

Top Antenna, Variable Density Whisper-Shout

The top antenna transmits the whisper-shout sequence shown in FIGS. 9–14 when garbling is detected in one or more of the medium-density steps. More specifically, when garbling is detected in one of the moderate density steps, each such step is replace by a series of narrow, high-density steps.

Step 1 Replacement

Figure 9:
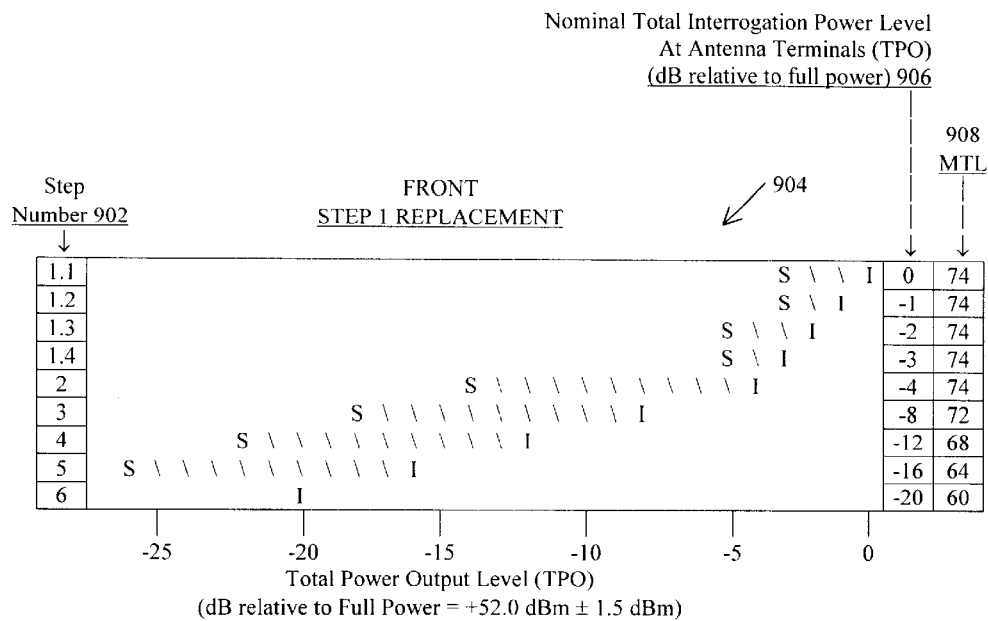
FIGS. 9–14 show the variable density whisper-shout sequences that replace specific steps in the whisper-shout sequence shown in FIG. 6.

When garbling is detected in the forward direction during the first step of a sequence, the variable-density sequence illustrated in FIG. 9. In the illustrated embodiment, a nine-step sequence is broadcast instead of the medium-density sequence (six-step) or the high-density sequence (twenty-four steps). The broadcast of fewer steps for each sequence reduces power density in the surveillance while accurately identifying and tracking each target aircraft.

Typically, if garbling is detected in the airspace covered by the interrogations relating to step number 1, it means that the intruding aircrafts are at the edge of the surveillance volume as broadcast power is at full power. The forward step 1 replacement sequence comprises a series of broadcasts designed to divide the outermost portion of the surveillance volume into sufficiently smaller volumes on the next broadcast of the whisper-shout sequence to discriminate between closely spaced Mode A/C aircraft. Further since garbling was not found in the close-in region of the surveillance volume, the replacement broadcast sequence merely repeats the initial interrogations for the remaining surveillance volume.

The forward step 1 replacement sequence consists of a series of stepped power levels for each broadcast within the replacement sequence. The first broadcast, indicated as step 1.1 in column 902, is a full power broadcast. In contrast to the medium-density broadcast shown in FIG. 6, the suppression pulse is adjusted in step 1.1 so that it is only marginally less than the interrogation pulses to improved gradation and discrimination between the Mode A/C aircraft. Step 1.1 also defines a narrower bin of 2 dB, compared to the 10 dB bin of FIG. 6.

Any target responding to a step 1.1 interrogation is classified as in the outer most region or volume of the surveillance volume as the suppression pulse of step 1.1 is sufficient to inhibit replies from most other aircraft within the surveillance volume. It will be appreciated that even intruders previously classified as in the step 1 bin will drop out of the step 1.1 bin.

In the remaining steps of the step 1 replacement sequence, steps 1.2–1.4, the transmit power decreases by 1 dB per step from the previous transmit power level as indicated in column 906. Thus, the sequence is broadcast at −1 dB relative to full power in step 1.2, −2 dB relative to full power in step 1.3 and −3 dB relative to full power in step 1.4.

In step 1.2, the broadcast power of the interrogation pulse is reduced but the broadcast power of the suppression pulse and the MTL remain unchanged. This combination enables finer discrimination of aircraft on the outer edge of the surveillance volume. Changing the bin width in an alternating fashion between −2 dB and −1 dB, the variable density sequence takes advantage of the inherent differences between transmitters to segregate the traffic into narrowly defined volumes of airspace and eliminate the garble.

The MTL setting in column 908 remains unchanged throughout the broadcast of the step 1 replacement sequence. It is appreciated that the MTL setting is selected to control multi-path and direct-path reflection by discriminating against delayed and low power reflections.

Step 2 Replacement

Figure 10:
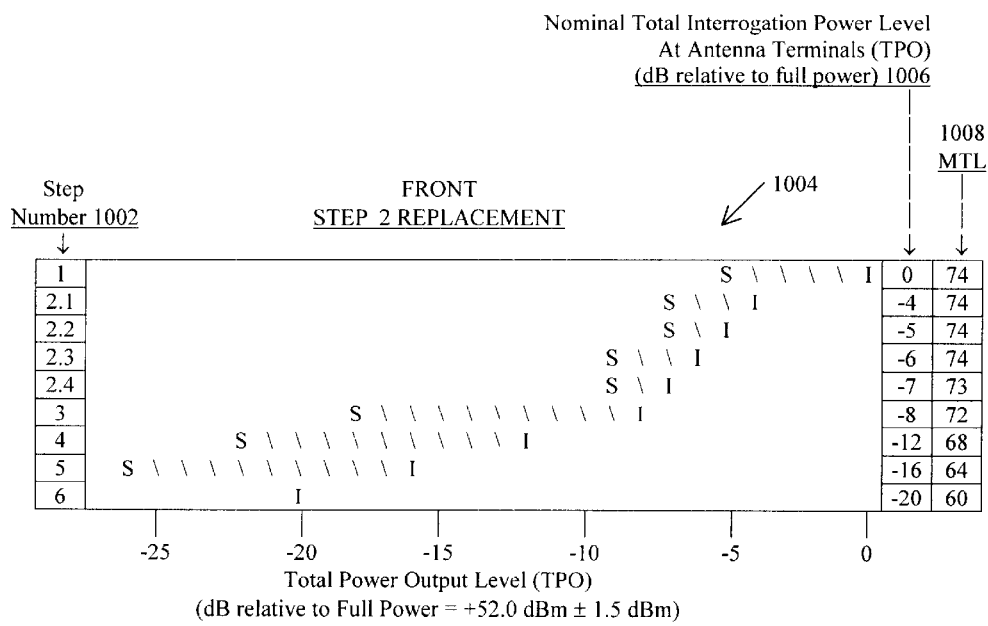

When garbling is detected in the forward direction during the second step of a broadcast sequence, the variable-density sequence illustrated in FIG. 10 is broadcast. The forward step 2 replacement sequence also comprises a series of steps where the broadcast power is reduced in a stepped fashion.

In the next following broadcast, step 1 in column 1002 is broadcast at full power and with a MTL setting at 74 as in the medium-density broadcast. The broadcast sequence begins with a modified step 1 full power broadcast. However, rather than define a 10 dB bin, the suppression pulse is broadcast power is increased to reduce the overlap with step 2. The smaller bin discriminates against target aircraft that might respond to both a step 1 and a step 2 broadcast.

The replacement sequence for the step 2 broadcast also comprises a series of stepped power levels for each broadcast within the replacement sequence. The first broadcast, indicated as step 2.1 in column 1002, is broadcast at the original power, that is, 4 dB below a full power broadcast. The suppression pulse is adjusted in step 2.1 so that it is only marginally less than the interrogation pulses to improved gradation and discrimination of Mode A/C aircraft. Step 2.1 defines a narrower bin of 3 dB. It will be noted that there is little overlap between the step 1 bin and the step 2.1 bin thereby offering greater resolution and discrimination between closely spaced aircraft.

Steps 2.2–2.4 of the step 2 replacement sequence decrease the transmit power by 1 dB per step from the previous transmit power level as indicated in column 1006. Thus, the sequence is broadcast at −4 dB relative to full power in step 2.1, −5 dB relative to full power in step 2.2, −6 dB relative to full power in step 2.3 and −7 dB in step 2.4.

The suppression pulse of step 2.1 limits overlap between the respective bins by associated with steps 2.1 and 2.2 to inhibit replies from aircraft that would otherwise respond to both interrogations. Similarly, the suppression pulse in steps 2.3 and 2.4 is adjusted to minimize receiving multiple responses from aircraft at the periphery of a surveillance volume. The MTL decreases from its initial setting to a lower setting to match the lowered broadcast power of step 2.4 as indicated in column 1008. It is to be understood that the MTL may be adjusted at some step other than with respect to step 2.4 if engineering design constraints so require.

The remaining steps, that is steps 3, 4, 5 and 6, of the medium density broadcast are then broadcast as in the original sequence as these were previously non-garbled.

Step 3 Replacement

Figure 11:
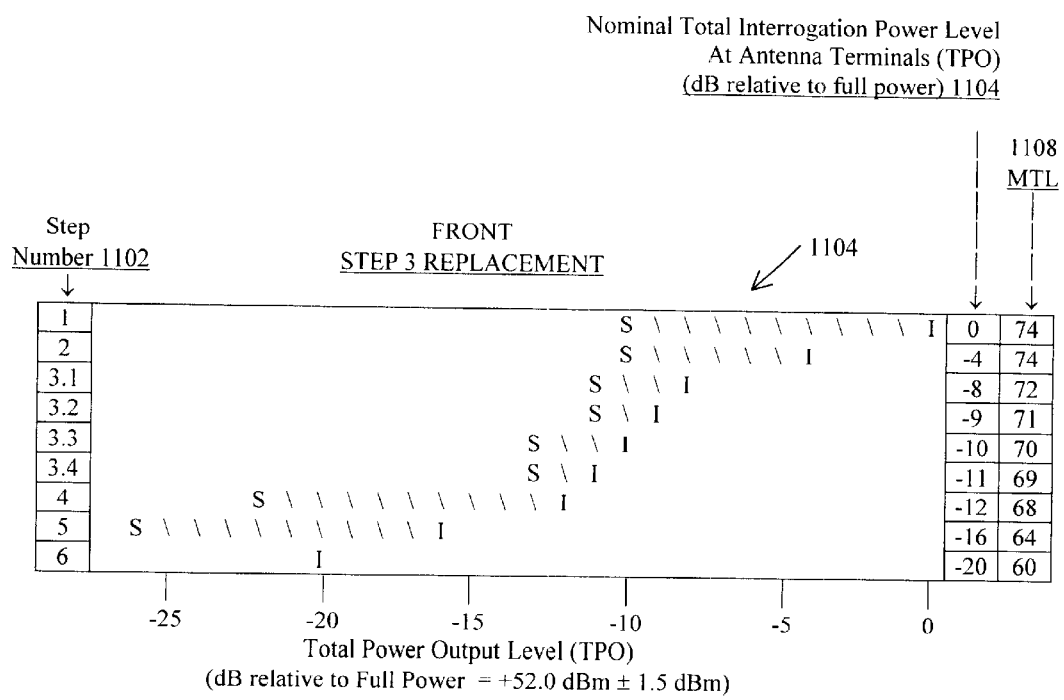

When garbling is detected in the forward direction during the third step of a medium-density sequence broadcast (step number 3), the variable-density sequence illustrated in FIG. 11 is next broadcast. The step 3 replacement sequence also comprises nine steps rather than the six steps of the original medium-density broadcast. Step number 1 in column 1102 is broadcast as in the original medium density whisper-shout sequence since there was no garbling in that portion of the surveillance volume. With the second step, step number 2 in column 1102, the suppression pulse is increased to minimize the overlap with the surveillance covered by the step number 3 of the broadcast.

Beginning with the third step of the sequence, a step 3 replacement sequence is broadcast. The initial interrogation at step number 3.1 in column 1102 is broadcast with a TPO of −8 dB relative to full power and the MTL is set to 72. This is the same transmit power and MTL as in the original step 3 broadcast in the medium density interrogation. However, to better differentiate among the target aircraft in the portion of the surveillance corresponding to the step 3 broadcast, the suppression pulse is set to form a 3 dB bin.

Step 3.2 is then transmitted at a TPO that decreases by 1 dB with respect to the TPO of the previous step. This means that the broadcast power is −9 dB below full power. The suppression pulse is broadcast at a level to form a 2 dB bin. To better differentiate among target aircraft, the suppression pulse for both steps number 3.1 and 3.2 is broadcast at the same level but the broadcast interrogation pulse is reduced by 1 dB. To ensure detection, the MTL may need to be reduced, as illustrated in column 1108 for step 3.2.

In step 3.3, the interrogation pulse is set to −10 dB less than full power with the suppression pulse set to form a 3 dB bin. The sequence continues with step number 3.4 as indicated at column 1102 where the TPO is further reduced by −1 dB to −11 dB below full power. The suppression pulse for both steps number 3.3 and 3.4 is broadcast at the same level. To ensure detection, the MTL may need to be reduced, as illustrated in column 1108 for steps 3.3 and 3.4.

The remaining steps, that is steps 4, 5 and 6, of the medium density broadcast are then broadcast as in the original sequence as these were previously non-garbled.

Step 4 Replacement

Figure 12:
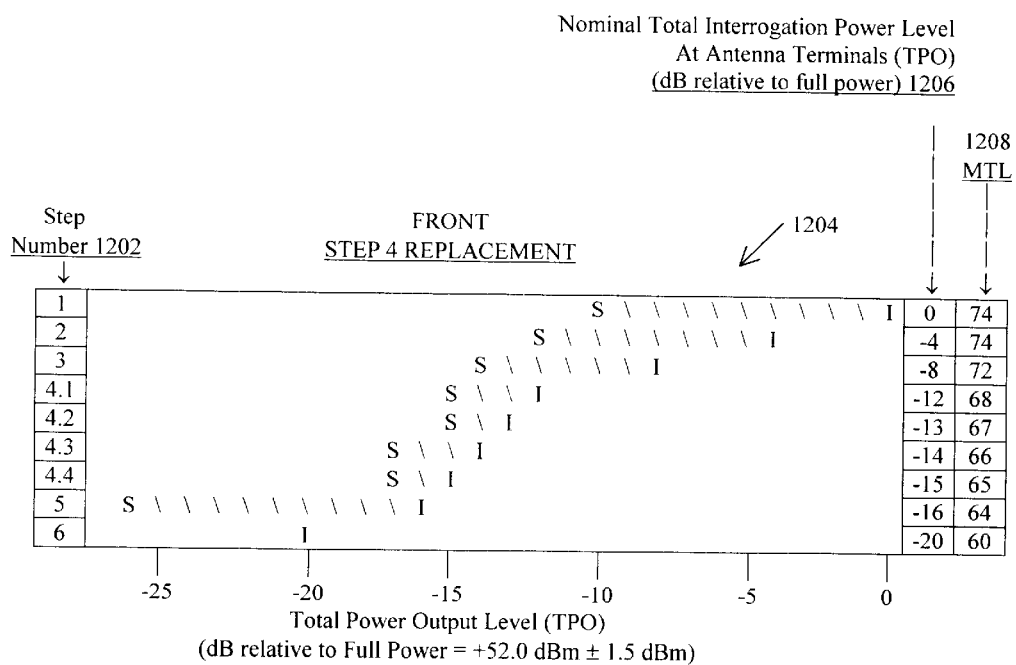

FIG. 12 illustrates the variable density pattern broadcast when garbling is detected in the forward direction during the fourth step of a medium-density sequence broadcast (step number 4). The step 4 replacement sequence is a nine step sequence that begins with step numbers 1 and 2 identical to the interrogation broadcast of the original sequence illustrated in FIG. 6. Beginning with the third step, the suppression pulse is increased to minimize the overlap with the surveillance covered by step number 4 of the interrogation broadcast. The total interrogation level begins at −12 dB below full power and decreases by 1 dB for each of the next succeeding interrogation. The MTL is correspondingly reduced as indicated in column 1208. Aircraft in the surveillance volume associated with the fourth step are differentiated in the manner described above with steps 1, 2 and 3.

It should be apparent in view of the pattern illustrated by the above description that the general scheme is to segregate aircraft by methodically broadcasting interrogation pulses and minimizing the number of responding aircraft by judiciously adjusting the interrogation and suppression pulses' broadcast power relative to the immediately preceding interrogation. By changing the bin width in an alternating fashion between −2 dB and −3 dB, the variable-density sequence takes advantage of the inherent differences between transmitters in order to segregate the traffic into defined volumes of airspace and eliminate the garble. Steps 5 and 6 of the medium density broadcast are then broadcast as in the original sequence illustrated in FIG. 6.

Step 5 Replacement

Figure 13:
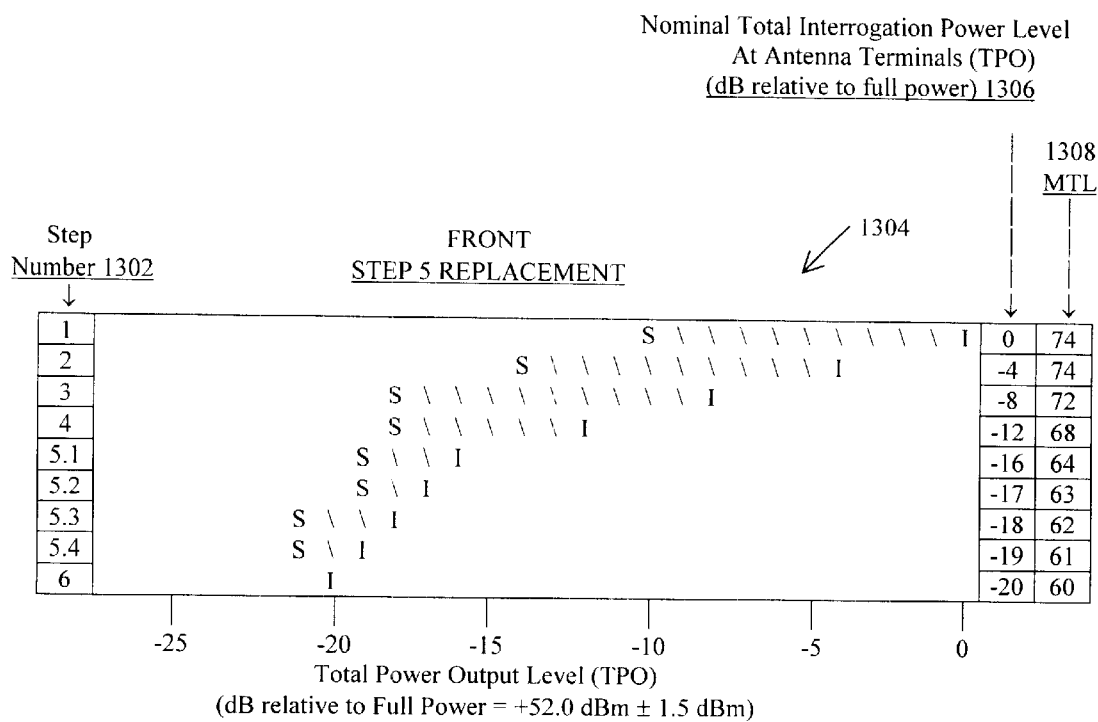

FIG. 13 illustrates the variable density pattern broadcast when garbling is detected in the forward direction during the fifth step of a medium-density sequence broadcast. The step 5 replacement sequence is a nine step sequence that begins with the first three steps identical to the interrogation broadcast of the original sequence illustrated in FIG. 6. In the fourth step, the suppression pulse is increased to minimize the overlap with the surveillance covered by step number 4 of the interrogation broadcast. The total interrogation level begins at −16 dB below full power and decreases by 1 dB for each of the next three succeeding interrogations. The MTL is correspondingly reduced as indicated in column 1308. Steps 6, of the medium density broadcast, is then broadcast as in the original sequence illustrated in FIG. 6.

Step 6 Replacement

Figure 14:
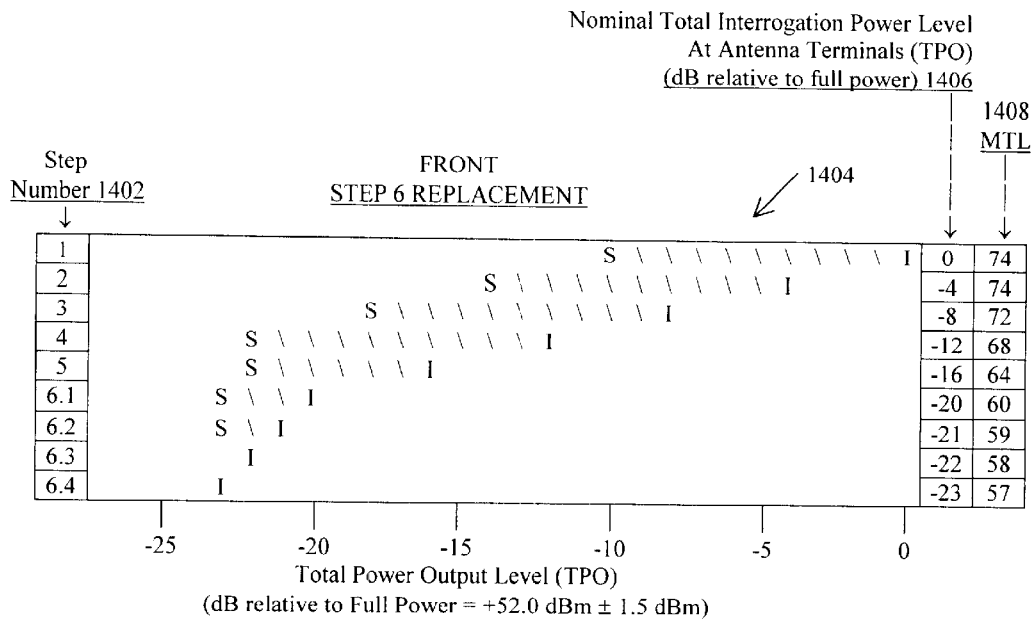

FIG. 14 illustrates the variable density pattern broadcast when garbling is detected in the forward direction during the sixth step of a medium-density sequence broadcast. The step 6 replacement sequence is a nine step sequence that begins with the first four steps identical to the interrogation broadcast of the original sequence illustrated in FIG. 6. In the fifth step, the suppression pulse is increased to minimize the overlap with the surveillance covered by step number 5 of the interrogation broadcast. The total interrogation level begins at −20 dB below full power and decreases by 1 dB for each of the next three succeeding interrogations. The MTL is correspondingly reduced as indicated in column 1408. Rather than merely broadcast a series of four interrogation pulses however, the first two steps of the step 6 replacement sequence are each preceded by a suppression pulse to form a −3 dB bin and a −2 dB bin. Then steps 6.3 and 6.4 are broadcast with a stepped interrogation but without any preceding suppression pulse. In this manner, target aircraft that are detected proximate to the reference aircraft will respond to even the lowest power broadcast.

Top Antenna, Variable Density Whisper-Shout—Side Quadrant

A variable whisper-shout sequence is used when garbling is detected in one or more of the moderate density steps in the side quadrants. The moderate density step where garbling was detected shall be replace by a series of steps as shown in FIGS. 15–19.

Replacement Interrogation Sequence for Side Quadrants

Figure 15:
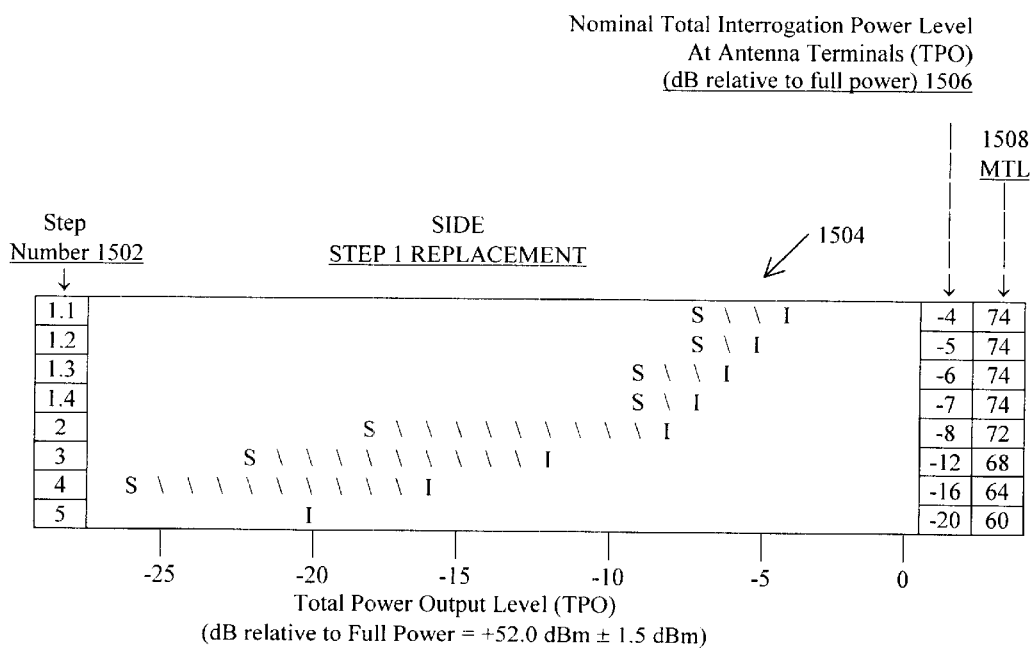
FIGS. 15–19 show the variable density whisper-shout sequences that replace specific steps in the whisper-shout sequence shown in FIG. 7.
Figure 16:
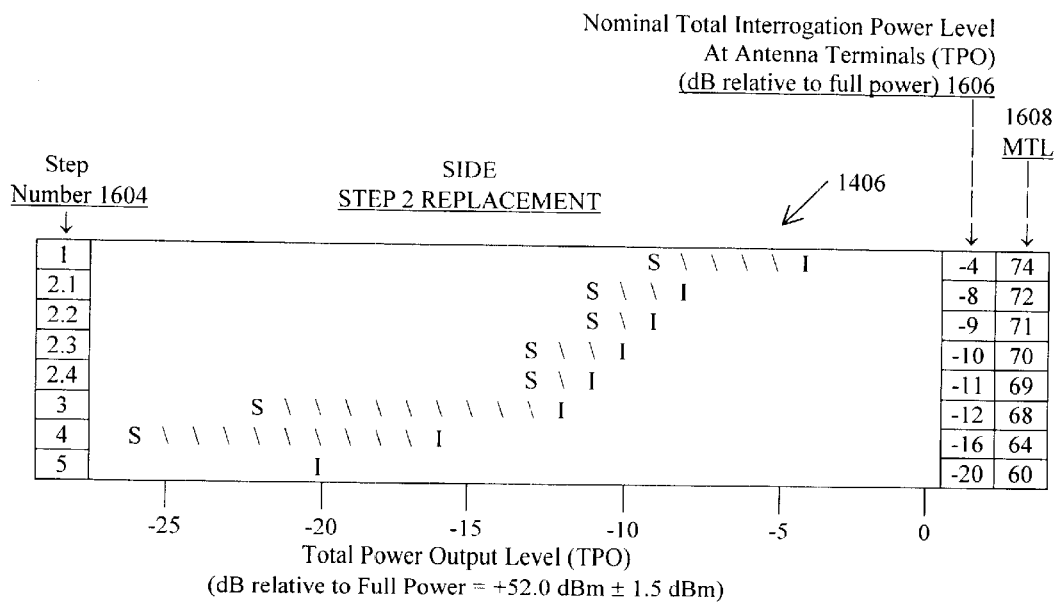
Figure 17:
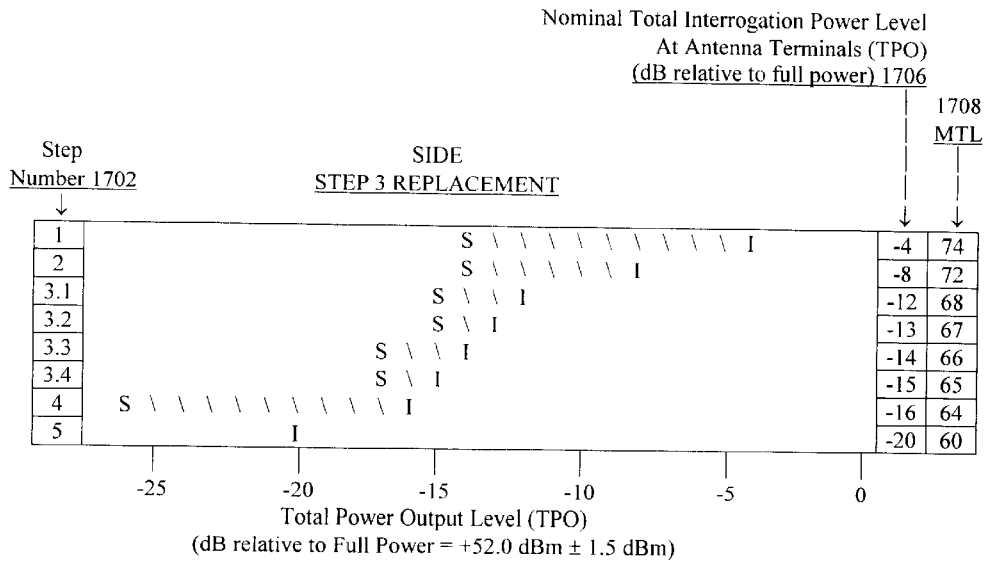
Figure 18:
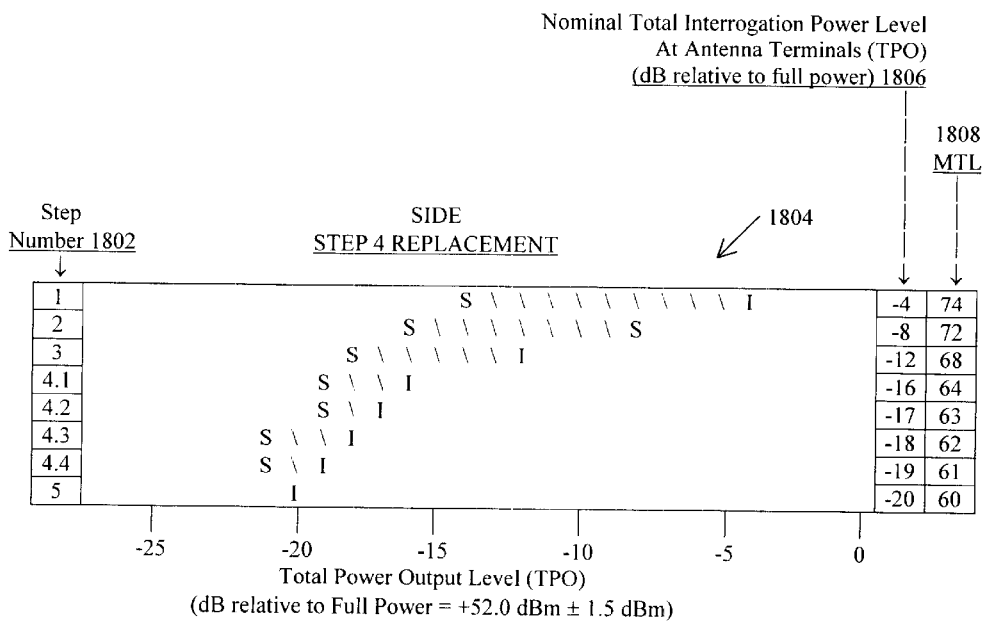
Figure 19:
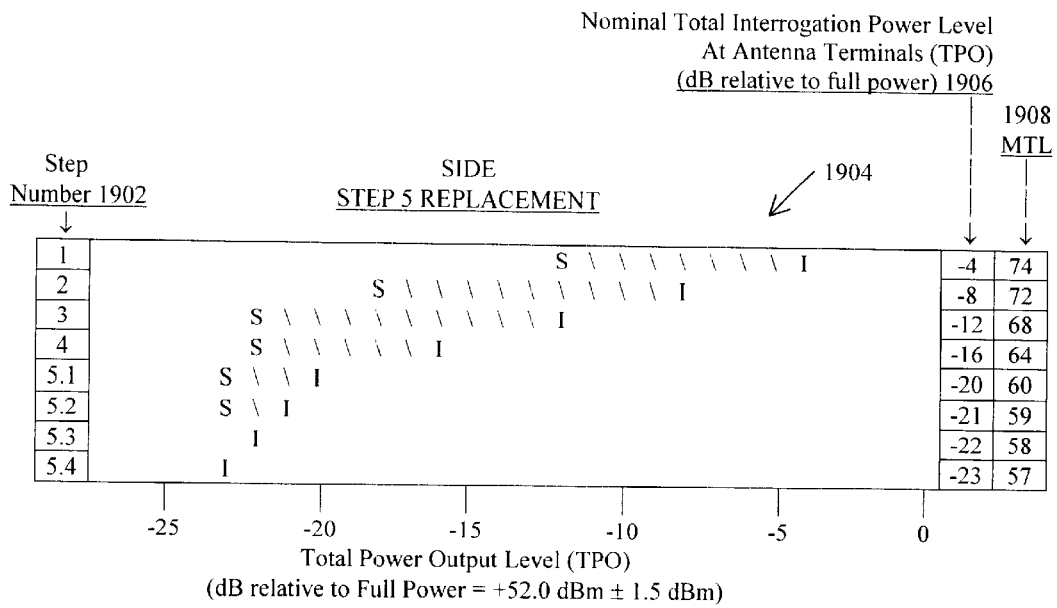
Figure 20:
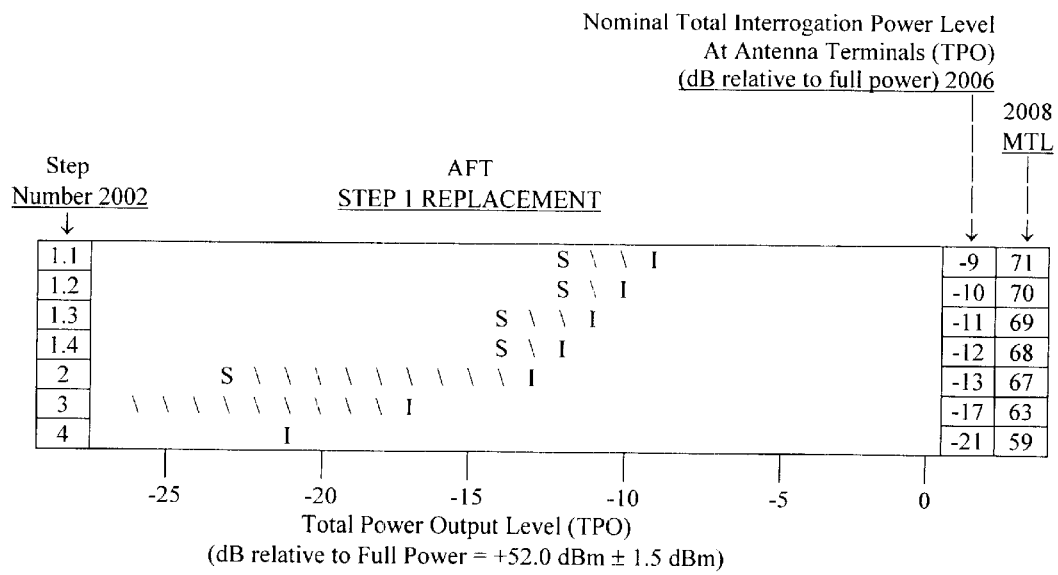
FIGS. 20–23 show the variable density whisper-shout sequences that replace specific steps in the whisper-shout sequence shown in FIG. 8.

When garbling is detected in either of the side quadrants during any step of interrogation sequence of FIG. 7, an appropriate replacement sequence is selectively broadcast. As illustrated in FIG. 15 the step1 replacement sequence comprises four steps in one preferred embodiment. Each step in the replacement sequence is at a lower broadcast power with power reduced by 1 dB per step from the previous interrogation broadcast. The suppression pulses are increased to form 3 dB and 2 dB bins to improved gradation of the surveillance volume in the manner describe above with respect to the front interrogation. The steps 2 through 5 of the side medium density interrogations are then broadcast.

Steps 2–5 Replacement

FIGS. 16–19 illustrate the variable density pattern broadcast when garbling is detected in the side quadrants during the second, third, fourth or fifth step, respectively, of a medium-density sequence side interrogation broadcast. As described above with respect to the front quadrant, the interrogation patterns FIGS. 16–19 illustrate the general scheme of segregate aircraft by methodically broadcasting interrogation pulses with step decrease in broadcast power so as to divide the surveillance volume associated with the step into a correspondingly smaller volume. At the same time the interrogations sequence minimizes the number of responding aircraft by suppression pulses' broadcast power to form relatively narrow bins to segregate the traffic.

It should be noted that in the final step of the side quadrant interrogation, that is, the fifth step, the first two steps of the step 5 replacement sequence are each preceded by a suppression pulse to form additional −3 dB bin and a −2 dB bin. Steps 5.3 and 5.4 are broadcast with a stepped decrease in interrogation broadcast power but without any preceding suppression pulse. The MTL is correspondingly reduced to correspond to the total interrogation power level.

Top Antenna, Variable Density Whisper-Shout—Aft Quadrant

The aft whisper-shout medium-density sequence is replaced by one or more of the variable density sequences illustrated in FIGS. 20–23 when garbling is detected in the aft quadrant.

When garbling is detected in the aft quadrant during the broadcast of interrogation sequence of FIG. 8, an appropriate replacement sequence is selectively broadcast. As illustrated in FIGS. 20–23, the replacement sequences each comprises four steps with each step at a lower broadcast power. In one preferred embodiment, the broadcast power reduced in 1 dB steps from the previous interrogation broadcast. The suppression pulses are correspondingly increased to form a 3 dB and a 2 dB bin as describe above with respect to the variable density front interrogation replacement sequences. The MTL is correspondingly reduced to correspond to the total interrogation power level as also describe above.

Interference Limiting

Interference limiting is a necessary part of the surveillance function. To ensure that no transponder is suppressed by TCAS activity for more than 2 percent of the time, and that TCAS does not create an unacceptably high fruit rate for the ATC radars, multiple TCAS units within detection range of each other (approximately 30 nmi) must limit their transmissions by decreasing the interrogation rate and power allocation for each interrogation to prevent undesired interference with ATC. Therefore, every TCAS unit counts the number of other TCAS units within detection range by transmitting TCAS broadcast messages every eight seconds that include the Mode S address of the transmitting aircraft. Mode S transponders accept the broadcast message, passes it on to TCAS and it is used to develop an estimate of the number of TCAS units within detection range of the reference aircraft. The number of total TCAS units in the surveillance volume is used to limit the interrogation rate and power by truncating each sequence. More specifically, the lowest numbered steps (for example, step number 1, then step number 2, etc.) are dropped first from each quadrant until interference is no longer a problem.

UF 19 ETCAS

Figure 21:
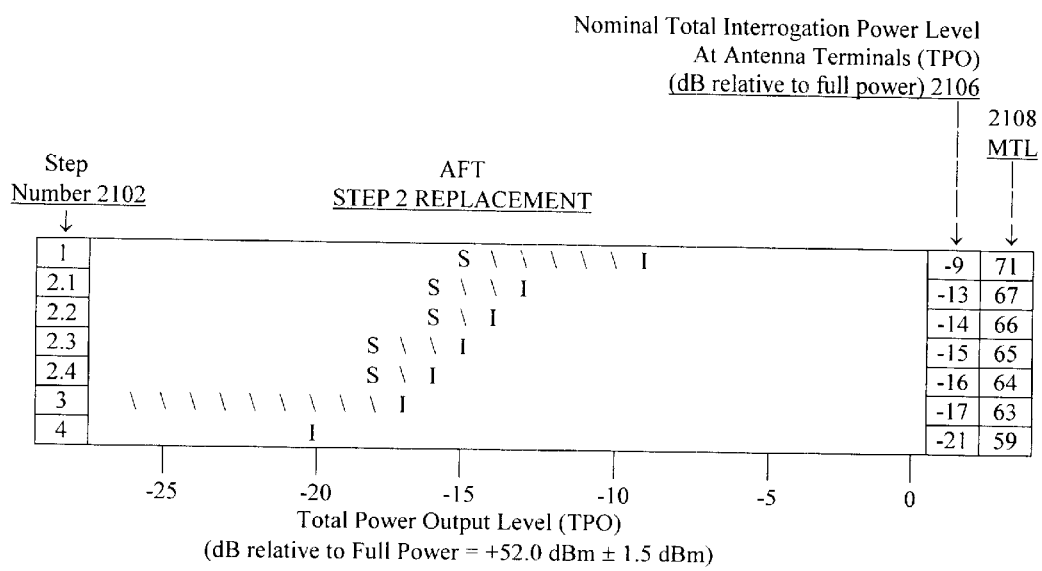
Figure 22:
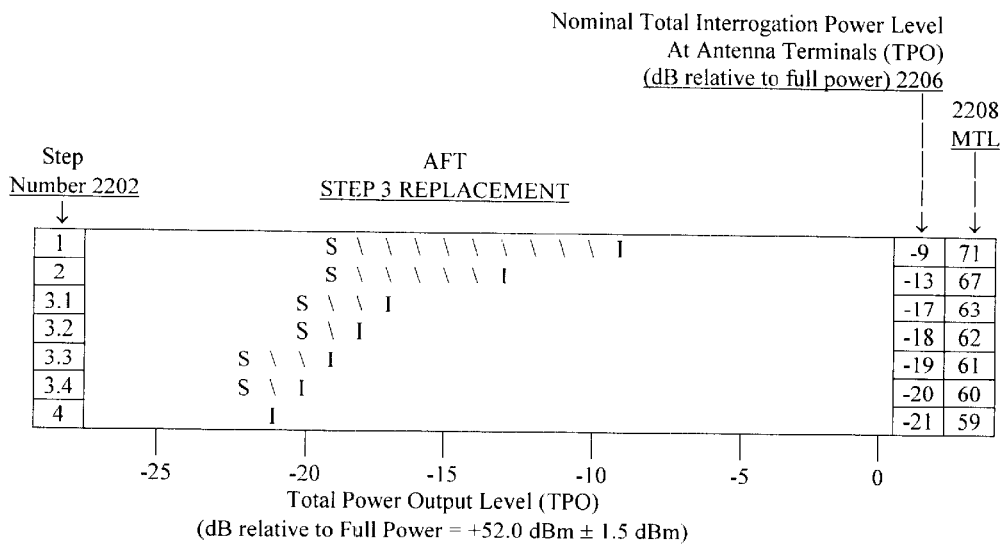
Figure 23:
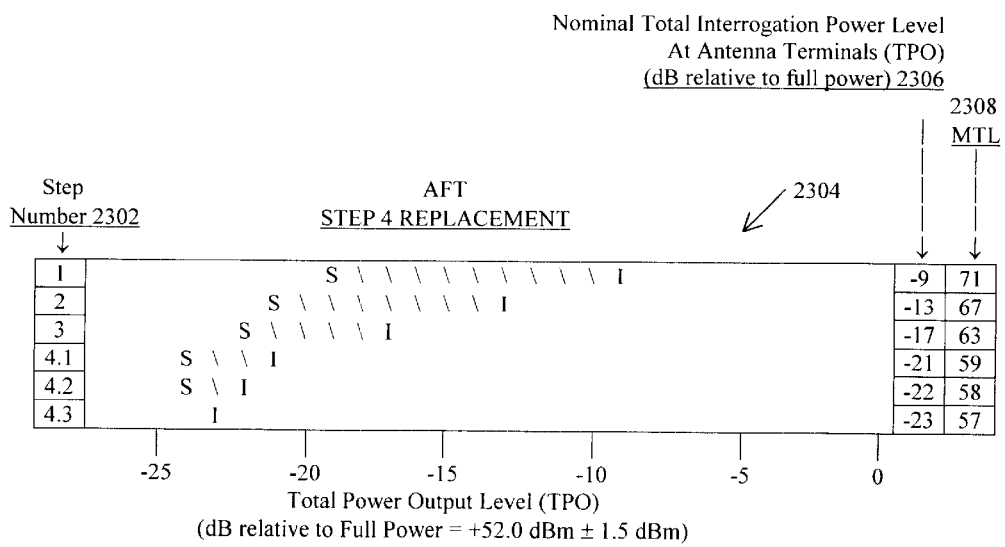
Figure 24:
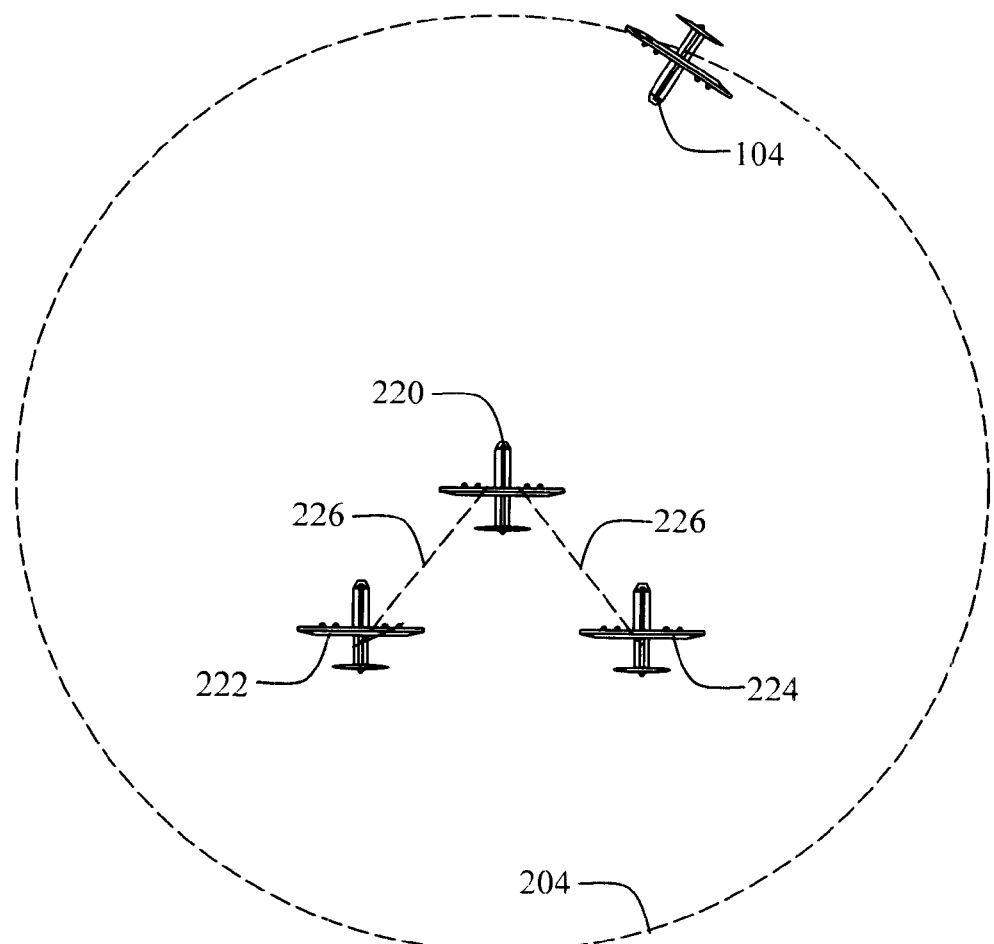
FIG. 24 illustrates a surveillance volume for a formation of aircraft.

Referring now to FIG. 21, the surveillance volume 204 surrounding a group of aircraft flying in formation. Although surveillance volume 204 is not drawn to scale, it will be apparent that the actual range will vary depending on the transmit power and reception sensitivity of the interrogating unit. In accordance with the present invention, surveillance volume may extend beyond forty nautical miles. With the formation of military aircraft flying 220–224 in the vicinity of commercial aircraft 104, the commercial aircraft may believe that is within the range of an airport due to a high number of other aircraft in the surveillance volume. Accordingly, commercial reference aircraft will reduce its interrogation power based on the incorrect assumption that it is in high-density airspace in the vicinity of an airport so as not to interfere with air traffic control functions. However, because of this erroneous conclusion by the TCAS system on a commercial aircraft, the surveillance volume is unnecessarily reduced, thereby leaving the commercial aircraft at risk of having little or no surveillance and therefore increase the risk to the flight crew and passengers. Accordingly, when a military formation is in the vicinity, formation members 222 and 224 will turn off their broadcast while the formation leader 220 will continue to broadcast. Thus, the reference aircraft will see only one broadcast tasking TCAS system in its surveillance volume and will maintain its broadcast power at the maximum necessary to track traffic throughout the surveillance volume.

To further minimize interference and transmit power within the surveillance volume, a broadcast inhibit is employed by military aircraft when flying in formation in another preferred embodiment of the present invention.

More specifically, in the military version of a TCAS system, referred to herein as E-TCAS, the UF 16 TCAS Broadcast is not transmitted to other Mode S aircraft in the area. By inhibiting the UF 16 broadcast, other aircraft will not include the military aircraft in their traffic count, commonly referred to as an NTA count. Rather than transmit a UF 16 broadcast, formation members using military E-TCAS transmit a UF 19 E-TCAS broadcast. Receiving E-TCAS aircraft use the UF 19 TCAS to generate an accurate NTA count but commercial TCAS units in the area will not be affected by the formation.

The mnemonic "NTA" refers to a count of aircraft in the surveillance volume derived from monitoring TCAS broadcast interrogations. Further refinement in the count is used in interference limiting by defining NTA3 and NTA6 as a ratio of aircraft within three and six nautical miles, respectively, compared to the total number of aircraft. "Alpha" defines the distribution of aircraft and is defined as:

$$\alpha = \log_{10}(NTA/NTA6)/\log_{10}25 \quad (4)$$

to obtain a distribution function of aircraft within 30 nautical miles and 6 nautical miles. Distribution of aircraft within six nautical miles is also calculated as follows:

$$\alpha = 0.25(NTA6/NTA3). \quad (5)$$

Using the distribution of TCAS interrogators in the surveillance volume, an interference algorithm can match the transmit power and frequency of interrogation to match the TCAS environment. To prevent a reduction in alpha and a corresponding detrimental reduction in E-TCAS range, the UF 19 TCAS Broadcast is included in the NTA count, but not toward the NTA3 and the NTA6 counts.

Formation Lead Surveillance

In accordance with the present invention, TCAS is modified so that aircraft flying in formation minimize broadcast power by sharing information between the formation leader and other formation aircraft. In this manner, transmit power is minimized even though there are significant numbers of aircraft in the area. More specifically, the formation leader performs active surveillance with the present 360-degree range coverage and data-links the contents of its TCAS intruder file to other members of the formation as indicated by data-links 226 in FIG. 21. Formation members use passive surveillance to track the position of the formation leader as well as the positions of the other ADS-B equipped intruders in the vicinity. ADS-B refers to Automatic Dependent Surveillance Broadcast and is a system that includes global positioning system (GPS) information in the data transmitted by the Mode S squitter.

The formation leader uses the UF/DF 19 data-link to transmit the following data to other aircraft in the formation. The data includes a time stamp, intruder identification, position, bearing, altitude and Mode A identifier. Only intruders that are obtained via the formation leader's active surveillance will be data-linked to other aircraft in the formation to further minimize transmit power.

By combining the power reduction methods for Mode S and Mode A/C interrogations with the modified UF 19 ETCAS of the present invention, it is possible to minimize transmit power. More specifically, with the formation leader conducting surveillance for the entire formation and the aggressive power reduction method described in FIG. 4, it is possible to achieve an enhanced surveillance while using less interrogation power.

While certain exemplary preferred embodiments have been described and shown in the accompanying drawings, it is to be understood that such embodiments are merely illustrative of and not restrictive on the broad invention. Further, it is to be understood that this invention shall not be limited to the specific construction and arrangements shown and described since various modifications or changes may occur to those of ordinary skill in the art without departing from the spirit and scope of the invention as claimed.

We claim:

1. In an aircraft having a collision avoidance system, a method for interrogating aircraft at extended ranges and for increasing interrogations in crowded airspace, said method comprising:

identifying aircraft within a surveillance volume in response to a full power broadcast of a Mode S interrogation;

classifying each identified aircraft as either traffic or intruder;

maintaining a track for each aircraft;

reducing the transmit power of a next Mode S interrogation directed to one of said aircraft;

determining whether said one of said aircraft responds to said reduced power transmission of said Mode S interrogation;

if said one of said aircraft responds said Mode S interrogation, repeating said maintaining, reducing and determining steps; and if said one of said aircraft fails to respond to said Mode S interrogation, increasing said transmit power of a next Mode S interrogation directed to said one of said aircraft.

2. The method of claim 1 wherein said reducing step further includes the steps of:

comparing the transmit power of said next Mode S interrogation to a minimum transmit power level;

if the transmit power of said next Mode S interrogation is equal to said minimum transmit power level, transmitting said next interrogation; and if the transmit power of said next Mode S interrogation is greater than to said minimum transmit power level, decreasing said transmit power level, based on range to target, before transmitting said next interrogation.

3. The method of claim 1 further comprising the steps of:

reducing the transmit power of a next Mode S interrogation directed to one of said aircraft identified as an intruder;

determining whether said one of said aircraft identified as intruder responds to said reduced power transmission of said Mode S interrogation;

if said one of said aircraft identified as an intruder responds to said Mode S interrogation, repeating said maintaining, reducing and determining steps; and if said one of said aircraft identified as an intruder fails to respond to said Mode S interrogation, increasing said transmit power of a next Mode S interrogation.

4. The method of claim 1 further comprising the step of increasing said Mode S interrogation transmit power if said one of said aircraft fails to respond to a previous transmission.

5. The method of claim 4 further comprising the step of decreasing said Mode S interrogation transmit power to an intermediate transmit power less than standard power after said one of said aircraft responds to the previous transmission.

6. The method of claim 5 further comprising the step of increasing said Mode S interrogation transmit power if said one of said aircraft fails to respond to a previous transmission.

7. The method of claim 1 further comprising the steps of:
broadcasting a first whisper-shout sequence to detect Mode A/C aircraft in said surveillance volume, said first whisper-shout sequence comprising a plurality of steps, each of said plurality of steps having a transmit power to interrogate Mode A/C aircraft within a portion of said surveillance volume; and
in response to detection of garbling in a portion of said surveillance volume, broadcasting a second whisper-shout sequence, said second whisper-shout sequence comprising a plurality of steps for detecting Mode A/C aircraft within a specific portion of said surveillance volume where said garbling is detected.

8. The method of claim 7 wherein said second whisper-shout sequence comprises a plurality of high density interrogation steps, the first of said high density interrogation steps having a transmit power equal to a corresponding interrogation step in said first whisper-shout sequence where said garbling was detected, the last of said high density interrogation steps having a transmit power marginally above the next to occur step in said first whisper-shout sequence.

9. The method of claim 7 further comprising the step of replacing at least one of said steps in said first sequence where garbling is detected with a plurality of high density steps.

10. The method of claim 7 further comprising the step of broadcasting a high-density whisper-shout sequence if garbling is detected said second sequence.

11. The method of claim 1 further comprising the steps of:
for a plurality of aircraft flying in formation, inhibiting TCAS Surveillance interrogations from all but one of said plurality of aircraft flying in formation;
transferring, from a formation leader, information relating to said TCAS Surveillance interrogations to said plurality of aircraft other than said formation leader, said formation leader responsible for conducting surveillance of aircraft within said surveillance volume for said plurality of aircraft.

12. The method of claim 11 further comprising the steps of:
broadcasting, from said plurality of aircraft flying in formation, a UF 19 E-TCAS broadcast; and
determining the number of TCAS-equipped aircraft within said surveillance volume.

13. The method of claim 11 further comprising the step of conducting, by said plurality of aircraft flying in formation, passive surveillance of said surveillance volume.

14. A method for conducting surveillance of an airspace surrounding an aircraft to track Mode S aircraft, said method comprising the steps of:
tracking Mode S aircraft within said surveillance volume with a progressively reduced transmission power of said Mode S tracking interrogation as a function of range; and
adjusting the transmission power of said Mode S tracking interrogation to track said Mode S aircraft in response to relative motion of said aircraft and said Mode S aircraft to minimize transmission power over time.

15. The method of claim 14 wherein said adjusting step further includes the steps of:
comparing the transmission power of said Mode S tracking interrogation to a minimum transmission power level;

if the transmission power of said Mode S tracking interrogation is equal to said minimum transmission power level, transmitting said next Mode S tracking interrogation; and
if the transmission power of said Mode S tracking interrogation is greater than to said minimum transmission power level, decreasing said transmission power level based on the range to said Mode S aircraft before transmitting a next Mode S tracking interrogation.

16. The method of claim 14 wherein said adjusting step further comprises the steps of:
reducing the transmission power of said Mode S tracking interrogation directed to said Mode S aircraft identified as an intruder;
determining whether said Mode S aircraft identified as intruder responds to said reduced power transmission of said Mode S interrogation;
if said Mode S aircraft identified as an intruder responds to said Mode S tracking interrogation, repeating said reducing and determining steps; and
if said one of said aircraft identified as an intruder fails to respond to said Mode S interrogation, increasing said transmission power of a next Mode S interrogation.

17. The method of claim 16 further comprising the step of increasing said Mode S interrogation transmission power to a maximum, based on range to said Mode S aircraft, if said one of said aircraft fails to respond to a previous Mode S tracking interrogation.

18. A method for conducting surveillance of an airspace surrounding an aircraft to track Mode A/C aircraft and to minimize transmission power over time, said method comprising the steps of:
transmitting a first whisper-shout sequence to track Mode A/C aircraft in said surveillance volume, said first whisper-shout sequence comprising a plurality of interrogation steps, each of said plurality of interrogation steps having an associated transmit power level sufficient to interrogate Mode A/C aircraft within a portion of said surveillance volume;
adjusting a receiver trigger level to detect replies to said whisper-shout sequence, said trigger level adjusted to correspond to the interrogation power level; and
in response to detection of garbling in one of said portions of said surveillance volume, transmitting a second whisper-shout sequence, said second whisper-shout sequence comprising a plurality of steps for detecting Mode A/C aircraft within a specific portion of said surveillance volume where said garbling is detected.

19. The method of claim 18 wherein said first whisper-shout sequence comprises a medium-density interrogation sequence.

20. The method of claim 18 wherein said second whisper-shout sequence comprises a high-density interrogation sequence within the range where garbling was detected.

21. The method of claim 18 wherein said first whisper-shout sequence comprises a medium-density interrogation sequence and said second whisper-shout sequence comprises a high-density interrogation sequence within the range where garbling was detected.

22. A method for conducting surveillance of an airspace surrounding an aircraft to track Mode S and Mode A/C aircraft and to minimize transmission power over time, said method comprising the steps of:
tracking Mode S aircraft within said surveillance volume with a progressively reduced transmission power of said Mode S tracking interrogation as a function of range;

adjusting the transmission power of said Mode S tracking interrogation to track said Mode S aircraft in response to relative motion of said aircraft and said Mode S aircraft to minimize transmission power over time;

transmitting a first whisper-shout sequence to track Mode A/C aircraft in said surveillance volume, said first whisper-shout sequence comprising a plurality of interrogation steps, each of said plurality of interrogation steps having an associated transmit power level sufficient to interrogate Mode A/C aircraft within a portion of said surveillance volume;

adjusting a receiver trigger level to detect replies to said whisper-shout sequence, said trigger level adjusted to correspond to the interrogation power level; and in response to detection of garbling in one of said portions of said surveillance volume, transmitting a second whisper-shout sequence, said second whisper-shout sequence comprising a plurality of steps for detecting Mode A/C aircraft within a specific portion of said surveillance volume where said garbling is detected.

23. The method of claim 22 wherein said first whisper-shout sequence comprises a medium-density interrogation sequence and said second whisper-shout sequence comprises a high-density interrogation sequence within the range where garbling was detected.

24. The method of claim 22 wherein said tracking step further includes the steps of:

comparing the transmit power of said next Mode S interrogation to a minimum transmit power level;

if the transmit power of said next Mode S interrogation is equal to said minimum transmit power level, transmitting said next interrogation; and if the transmit power of said next Mode S interrogation is greater than to said minimum transmit power level, decreasing said transmit power based on range to said Mode S aircraft before transmitting said next interrogation.

25. The method of claim 22 further comprising the steps of:

for a plurality of aircraft flying in formation, inhibiting TCAS Surveillance interrogations from all but one of said plurality of aircraft flying in formation;

transferring, from a formation leader, information relating to tracked Mode S, Mode A and Mode C aircraft to said plurality of aircraft other than said formation leader, said formation leader responsible for conducting surveillance of Mode S, Mode A and Mode C aircraft within said surveillance volume for said plurality of aircraft.

26. The method of claim 25 further comprising the steps of:

broadcasting, from a plurality of aircraft flying in formation, a UF=19 E-TCAS broadcast; and determining the number of TCAS-equipped aircraft within a surveillance volume together with said plurality of aircraft.

27. The method of claim 26 further comprising the step of reducing the TCAS surveillance transmit power of said plurality of aircraft flying in formation based on the number of TCAS-equipped aircraft within said surveillance volume.

28. A method for conducting surveillance of Mode S, Mode A and Mode C aircraft in an airspace surrounding a formation of aircraft, said formation having a formation leader and at least one formation member, said method comprising the steps of:

inhibiting Mode S interrogation and whisper-shout interrogations from said at least one formation member;

performing passive surveillance by said at least one formation member to track the position of said formation leader and other passive intruders performing active interrogation by said formation leader;

transferring, from a formation leader to said at least one formation member, information relating to Mode S, Mode A and Mode C aircraft in said airspace.

29. The method of claim 26 further comprising the steps of:

broadcasting, from at least one formation member, a UF 19 E-TCAS broadcast; and determining the number of TCAS-equipped aircraft within said airspace.

30. The method of claim 26 further comprising the step of minimizing the apparent number of aircraft in said airspace to commercial aircraft.

31. The method of claim 28 wherein said step of performing active surveillance further comprises the steps of:

tracking Mode S aircraft within said airspace by said formation leader, said tracking including progressively reducing transmission power of said Mode S tracking interrogation as a function of range;

adjusting the transmission power of said Mode S tracking interrogation to track said Mode S aircraft in response to relative motion of said aircraft and said Mode S aircraft to minimize transmission power over time;

transmitting by said formation leader a first whisper-shout sequence to track Mode A/C aircraft in said airspace, said first whisper-shout sequence comprising a plurality of interrogation steps, each of said plurality of interrogation steps having an associated transmit power level sufficient to interrogate Mode A/C aircraft within a portion of said airspace;

adjusting a receiver trigger level to detect replies to said whisper-shout sequence, said trigger level adjusted to correspond to the interrogation power level; and in response to detection of garbling in one of said portions of said airspace, broadcasting a second whisper-shout sequence, said second whisper-shout sequence comprising a plurality of steps for detecting Mode A/C aircraft within a specific portion of said airspace where said garbling is detected.

32. The method of claim 31 wherein said first whisper-shout sequence comprises a medium-density interrogation sequence and said second whisper-shout sequence comprises a high-density interrogation sequence within the range where garbling was detected.

33. The method of claim 31 wherein said tracking step further includes the steps of:

comparing the transmit power of said next Mode S interrogation to a minimum transmit power level;

if the transmit power of said next Mode S interrogation is equal to said minimum transmit power level, transmitting said next interrogation; and if the transmit power of said next Mode S interrogation is greater than to said minimum transmit power level, decreasing said transmit power based on range to said Mode S aircraft before transmitting said next interrogation.

34. A low power method for interrogating Mode S traffic by a reference aircraft comprising the steps of:

A) transmitting an initial tracking interrogation at maximum power (Pmax) to detect traffic within a surveillance volume surrounding said reference aircraft;

B) after the track is established, transmitting subsequent tracking interrogations at successively reduced in power until either the intruder does not reply or a minimum power limit (Plim) is reached;

C) if said Mode S traffic does not reply to said tracking interrogation, transmitting a retry tracking interrogation at a higher power level;

D) transmitting an interrogation following said retry tracking interrogation which will be at an intermediate power level; and E) repeating steps B, C and D until said traffic is no longer within said surveillance volume.

35. The method of claim 34 wherein said interrogation power is adjusted for traffic within a portion of the surveillance volume bounded by a first and second range.

36. The method of claim 35 wherein said interrogation power is reduced in 1 dB steps for traffic beyond said second selected range limit relative to said reference aircraft.

37. The method of claim 34 wherein said interrogation power is adjusted in 2 dB steps for traffic between said first and second range limits.

38. The method of claim 34 wherein said retry tracking interrogation is at Pmax for traffic beyond said first range limit.

39. The method of claim 34 wherein said retry tracking interrogation power is defined by the equation: Pmax+20 log (R/10) for intruders within about ten nautical miles where Pmax denotes a maximum transmit power and R denotes the range to said traffic.

40. The method of claim 34 wherein said repeat interrogation power is defined by transmitting an interrogation immediately following said retry tracking interrogation will be at an intermediate power level between Pmax and the power level where the intruder did not reply.

41. The method of claim 40 wherein said repeat interrogation is followed by transmitting successive interrogations whose power levels are in 1 dB steps below said intermediate power level.

42. The method of claim 34 wherein said interrogation power for tracking interrogations in step B is greater than a minimum interrogation power limit determined by the formula:

$$P\text{lim}=P\text{max}+20 \log(R/40)$$

where Plim denotes the minimum transmit power for traffic in a range of between about ten nautical miles and about forty nautical miles, Pmax denotes a maximum transmit power and R denotes the range to said traffic.

43. The method of claim 34 wherein said interrogation power for tracking interrogations in step B is equal to a maximum transmit power if the range to said target is greater than about forty nautical miles.

* * * * *